US009424245B2

(12) United States Patent
Kassis et al.

(10) Patent No.: US 9,424,245 B2
(45) Date of Patent: Aug. 23, 2016

(54) UNIVERSAL LANGUAGE CLASSIFICATION DEVICES, SYSTEMS, AND METHODS

(71) Applicant: PersonalWeb Technologies, LLC, Tyler, TX (US)

(72) Inventors: Wasef Kassis, Tyler, TX (US); Jake Drew, Canton, TX (US); Joshua Cade Jarvis, Gilmer, TX (US); Bobby Charles Thomas, Tyler, TX (US); William Robert Zink, Sarasota, FL (US)

(73) Assignee: PersonalWeb Technologies, LLC, Tyler, TX (US)

( * ) Notice: Subject to any disclaimer, the term of this patent is extended or adjusted under 35 U.S.C. 154(b) by 250 days.

(21) Appl. No.: 13/893,371

(22) Filed: May 14, 2013

(65) Prior Publication Data

US 2014/0108005 A1 Apr. 17, 2014

Related U.S. Application Data

(60) Provisional application No. 61/647,608, filed on May 16, 2012.

(51) Int. Cl.
*G06F 17/27* (2006.01)
*G06F 17/30* (2006.01)
*G06K 9/62* (2006.01)
*G06F 9/46* (2006.01)

(52) U.S. Cl.
CPC .............. *G06F 17/271* (2013.01); *G06F 9/46* (2013.01)

(58) Field of Classification Search
CPC . G06F 17/271; G06F 17/274; G06F 17/2785; G06F 17/2775; G06F 17/30707; G06F 9/46
USPC .......... 704/1, 9; 707/705, 736, 737, 730, 742, 707/917, 999.005, 999.006, 999.003, 707/E17.061, E17.084, E17.09; 382/159
See application file for complete search history.

(56) References Cited

U.S. PATENT DOCUMENTS

| 5,371,807 A * | 12/1994 | Register et al. ............... 382/159 |
| 6,665,668 B1 * | 12/2003 | Sugaya et al. ................ 707/730 |
| 7,165,023 B2 * | 1/2007 | Corman et al. .................... 704/9 |
| 8,676,802 B2 * | 3/2014 | Zelevinsky et al. ........... 707/737 |
| 2008/0222133 A1 * | 9/2008 | Au et al. ........................... 707/5 |

* cited by examiner

*Primary Examiner* — Charlotte M Baker
(74) *Attorney, Agent, or Firm* — Siritzky Law, PLLC

(57) ABSTRACT

A computer-implemented method, implemented, at least in part, by hardware in combination with software, the method includes (A) obtaining text from a document; (B) parsing said text using at least one parallel sentence parsing process to obtain sentence data from said text; (C) parsing said sentence data using at least one parallel noun parsing process to obtain text data from said sentence data; (D) scoring said text data using at least one term scorer process and a known word list to obtain scored terms corresponding to said text data; and (E) determining known word scores corresponding to said text data, using said known word list, wherein said known word scores comprise base scores and category penetration scores; wherein steps (B), (C), (D), and (E) operate in parallel for at least some of the text from the document.

1 Claim, 7 Drawing Sheets

Fig. 6

| 602 SENTENCE TEXT | | | | |
|---|---|---|---|---|
| 604 INDEX | 606 TEXT | 608 WORD COUNT | 610 NO COMMA CAPITALIZED WORD COUNT | 612 SPECIAL CHARACTER COUNT |

Fig. 7

| 614 TERM TEXT | | | |
|---|---|---|---|
| 616 SENTENCE INDEX | 618 TERM INDEX | 620 TEXT | 622 WORD COUNT |

US 9,424,245 B2

UNIVERSAL LANGUAGE CLASSIFICATION DEVICES, SYSTEMS, AND METHODS

RELATED APPLICATION

This application is related to and claims priority from U.S. Provisional Patent Application No. 61/647,608, filed May 16, 2012, titled "UNIVERSAL LANGUAGE CLASSIFICATION DEVICES, SYSTEMS, AND METHODS," the entire contents of which, including the source code appendix, are fully incorporated herein by reference for all purposes.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

SOURCE CODE APPENDIX

The source code appendix from co-owned and copending U.S. Provisional Patent Application No. 61/647,608 is fully incorporated herein by reference for all purposes.

BACKGROUND

Field of the Invention

This disclosure relates to universal language classification, and, more particularly, to universal language classification devices, systems and methods.

In many environments there is a need to classify documents. As examples, incoming mail, facsimiles and emails, documents produced during litigation, files on a computer system, may all be sorted according to some categorization. The proliferation of documents only increases the need for efficient and accurate categorization.

DESCRIPTION OF THE DRAWINGS

FIGS. 6-7 are exemplary logical depictions of certain data structures used by a ULC.

DETAILED DESCRIPTION OF PRESENTLY PREFERRED EXEMPLARY EMBODIMENTS

Throughout this description, the embodiments and examples shown should be considered as exemplars, rather than limitations on the apparatus and methods disclosed or claimed.

Figure 1:
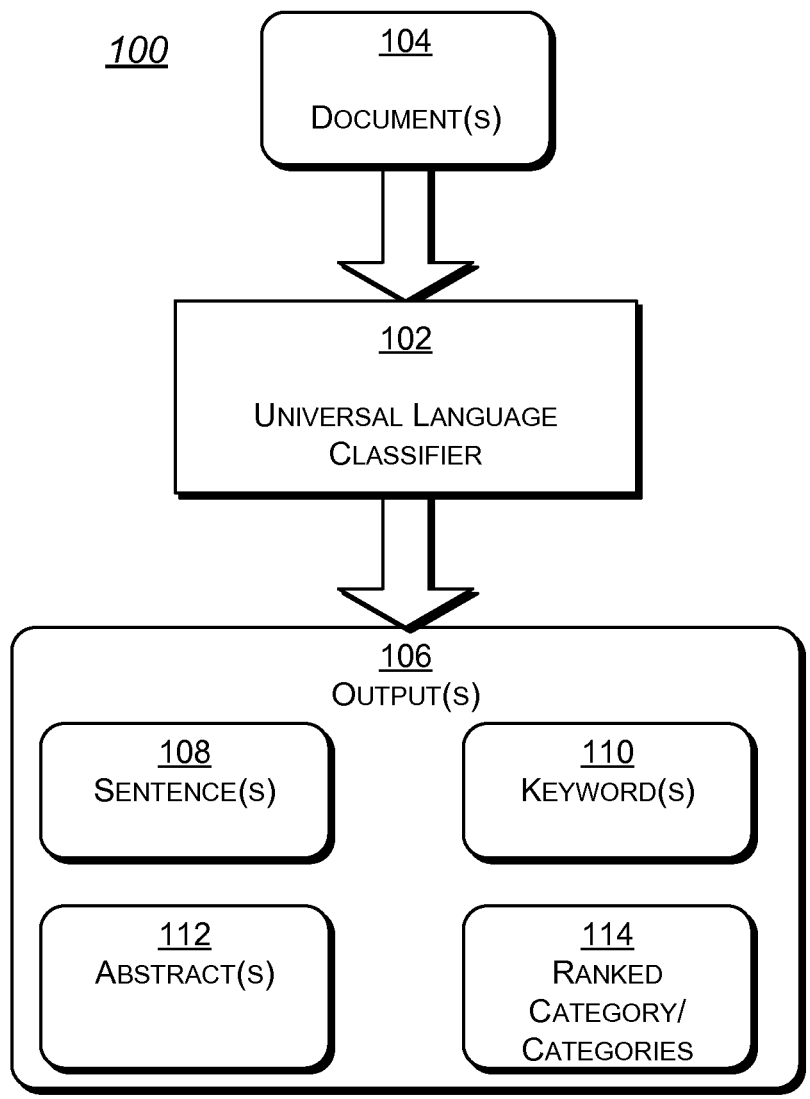
FIG. 1 provides a logical overview of an exemplary universal language classifier (ULC)

As shown in FIG. 1, in a ULC system 100, a universal language classifier 102 takes as input a document 104 and produces one or more outputs 106 including one or more of: sentence(s) 108, keyword(s) 110, abstract(s) 112, and ranked category (categories) 114. These outputs may be used to support additional processing on the input document 104.

It should be appreciated that the term "document" as used herein refers to any data item that includes text in any form, and those of skill in the art will realize and understand, upon reading this description, that the system is not limited by the actual form of any document, or the manner in which the document is stored or received.

As described herein a ULC 102 processes input data in a text/string format, and those of skill in the art will realize and understand, upon reading this description, that a particular input document may have to be converted from a proprietary format or from some other form (using, e.g., OCR) in order to produce the input to the ULC 102. Any preprocessing of the input document to produce a textual input to the ULC 102 can use known techniques and is not described here.

Figure 2:
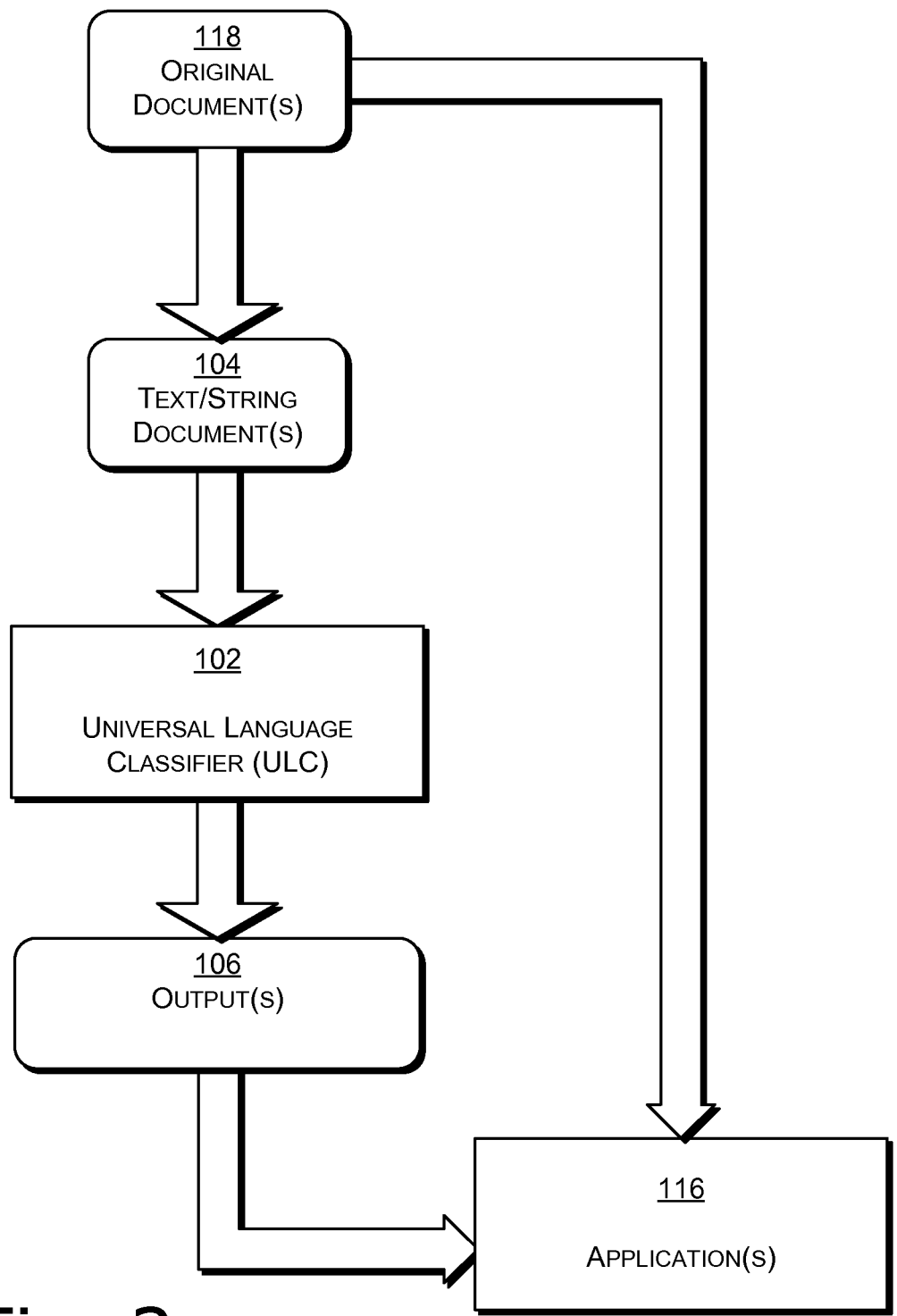
FIG. 2 depicts the use of a ULC in the context of specific document classification applications.

FIG. 2 depicts the use of a ULC 102, such as shown in FIG. 1, in the context of specific document classification applications 116. As shown in FIG. 2, output(s) from the ULC 102 are used by the application(s) 116 to process the input document. In the example shown in FIG. 2, the application(s) 116 may process the original input document 118 based, at least in part, on output(s) 106 of the ULC 102.

The particular processing by application(s) 116 may include: document classification for storage purposes, mail filtering, facsimile processing, and the like.

Figure 3:
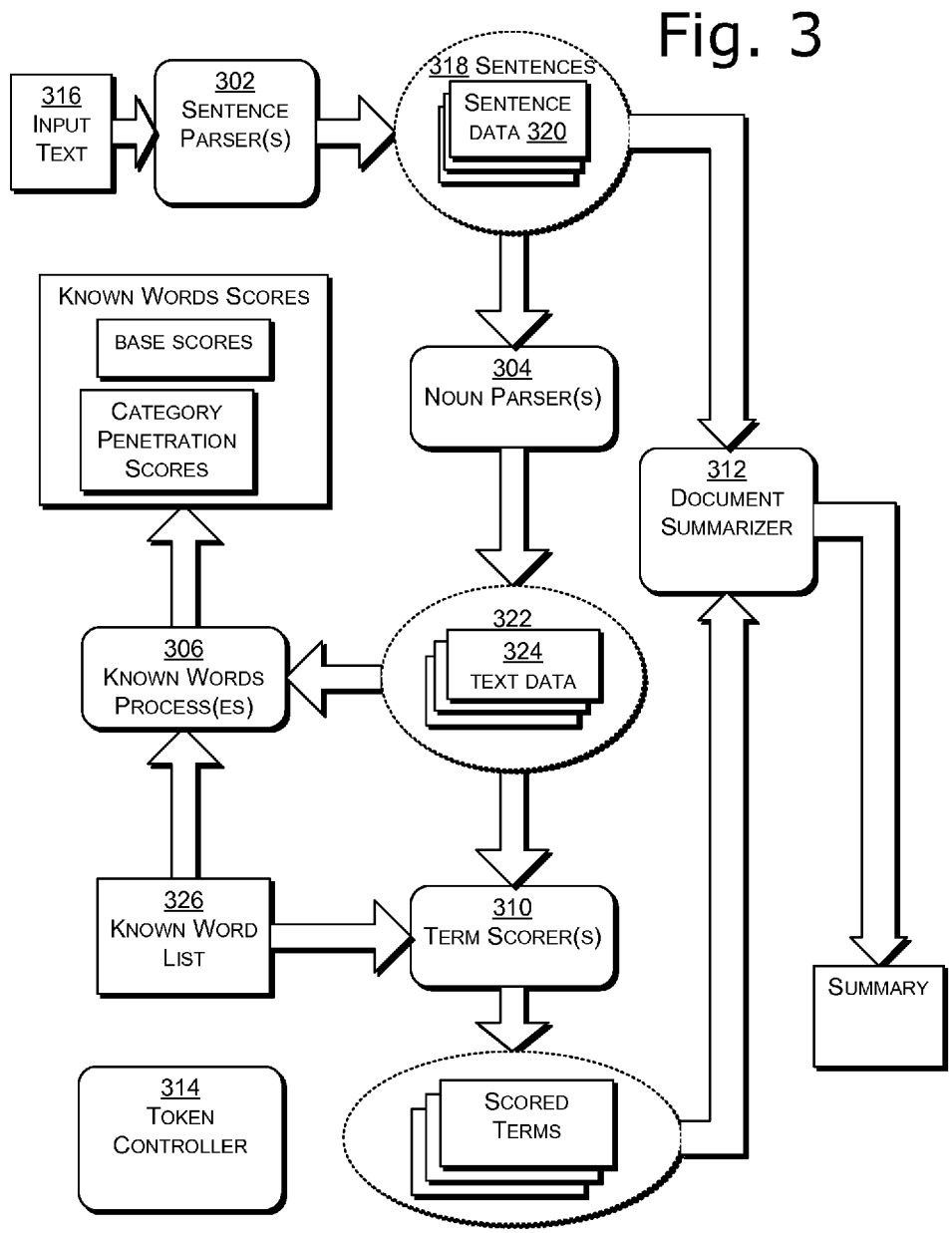
FIGS. 3-5 are exemplary logical depictions of aspects of the processing by a ULC.

FIG. 3 is a logical depiction of aspects of processing/processes performed by an exemplary ULC 102 of FIG. 1. These processes may include: Sentence Parser 302, Noun Parser 304, Known Words object 306, Known Words CUD 308, Term Scorer 310, Document Summarizer 312, and Token Controller 314.

With reference to FIG. 3, the Sentence Parser 302 identifies sentences in a provided block of input text. The ULC Noun Parser 304 identifies keyword/tokens/phrases in a provided block of input text. The ULC Known Words object 306 generates Known Words Base Scores for provided keyword/tokens/phrases. In addition, it keeps track of Known Words Category Penetration Scores for individual or multiple blocks of input text. The Known Words CUD 308 manages Known Words category updates, deletions, and additions. This includes a learning mode in which input text is processed, and the resulting words/tokens are added into a specific Known Words Category. The ULC Term Scorer 310 processes input text and identifies unique keywords keeping track of the sentences they occur in, the number of times the keyword occurs, and determines a Term Scorer Keyword Score for each keyword in the input document. The ULC Document Summarizer 312 uses a collection of sentences and scored terms to score each sentence identifying the most valuable/relevant sentences in the document. These sentences may be returned as the document abstract. The Token Controller 314 is preferably highly parallel producer/consumer pipeline that uses the Sentence Parser, Noun Parser, Term Scorer, and Document Summarizer during processing to produce an abstract and a set of scored keywords from the provided input text.

Although certain processes are shown in the drawing in FIG. 3 as a single box, it should be appreciated that each box may represent a number of processes executing in parallel on one or more processors. Thus, e.g., the Sentence Parser 302 shown in FIG. 3 may represent a number of concurrent/parallel sentence parser processes operating on parts of the input text.

ULC Engine Process Initialization

Various objects within the ULC Engine may be initialized individually, depending on what features of the ULC Engine are required. Each of these objects function independently.

However all generally require input data and produce output data. In most cases, ULC Engine objects participate in a highly parallel producer/consumer pipeline exchanging data in the following exemplary manner:

A Sentence Parser 302 must be created, if sentence breaking/identification will occur for the provided input text. The Sentence Parser 302 consumes input data in the form of a text string 316. In a presently preferred implementation, the text string is a C# string of text data that has been loaded into memory up to two gigabytes in size. The Sentence Parser 302 preferably produces output data in the form of a collection 318 of custom Sentence Text data structures. In order to achieve a high degree of parallelism in the ULC processing, the sentence parser 302 adds Sentence Text data to the collection 318 as soon as those data are generated. In a presently preferred implementation the ULC is implemented using the C# programming language, and the collection 318 is implemented as a C# Blocking Collection (parallel/thread safe collection). In this implementation, output data from the sentence parser 302 is "yield returned" which means that as soon as only one Sentence Text data structure is produced, the entire process yields and passes that Sentence Text data structure into a C# Blocking Collection that is exposed to any other parallel Sentence Text data consumption processes/threads.

In FIG. 3 and the other drawings showing operation of the parallel processing, the collections are shown as ellipses in dotted lines, with the elements of the collections shown as rectangles within the ellipses. For example, in FIG. 3, the output of the Sentence Parser 302 is shown as structures produced by the sentence parser 302).

A Noun Parser 304 must be created, if keyword/identification will occur for the provided input text. The Noun Parser 304 consumes input data from the collection 318 of sentence data 320 produced by the Sentence Parser 302. In a present implementation the Noun Parser 304 consumes input data in the form of a C# Blocking Collection (parallel/thread safe collection) of Sentence Text data structures.

The Noun Parser 304 produces output data in the form of a collection 322 of text data 324. In a present implementation the Noun Parser 304 produces output data in the form of a C# IEnumerable (read only) collection of custom Term Text data structures. In order to achieve a high degree of parallelism in the ULC processing, this output data should be "yield returned" so that as soon as only one Term Text data structure is produced, the entire process yields and passes that Term Text data structure into the C# Blocking Collection (parallel/thread safe collection 322) that is exposed to any other parallel Term Text data consumption processes/threads.

The Known Words object 306 must be created and a Known Words List 326 must be loaded into memory before any categorization can occur. The Known Words object 306 consumes input data in the form of a string (e.g., a C# string) that contains a single word phrase. The Known Words object 306 produces the following output data:

Known Words Base Score—An array of scores that represent the word/token/phrase's individual base score in each Known Words category Known Words Category Penetration Score—(m_iSumAllTerms_SortedScores) is stored in a Known Words Scores data structure that contains summary level scores for each category. These scores represent summary scores for each category since the last time that the ResetCategoryTotals process has been executed. The Known Words object 306 can keep track of category scores for only one block of input text or across multiple blocks of input text depending on how it is used. The category with the highest score determines the most accurate category assignment for each categorization session.

The Known Words Category Manger 308 must be created, if Known Words categories will be modified. Categories can be created, deleted, and updated. Categories are updated when new documents are learned into them, incrementing word/token frequencies for each identified word/token in the document. The Known Words CUD object 308 requires a Known Words object in order to be created. The Known Words CUD object is used to manipulate category structures in the provided Known Words CUD object.

A Term Scorer 310 must be created, if keyword scoring (required for abstract creation and categorization) will occur for the provided input text. A Term Scorer 310 cannot be created without providing it a Known Words object to use during scoring. The Term Scorer 310 consumes input data in the form of a parallel/thread safe collection of Term Text data structures. The Term Scorer 310 produces output data in the form of a parallel/thread safe dictionary of custom Scored Term data structures (preferably implemented as a C# Concurrent Dictionary).

A Document Summarizer 312 must be created, if abstract creation will occur for the provided input text. It should be appreciated that the document summarizer is independent of and has no impact on categorization or other ULC processes. The Document Summarizer 312 consumes input data in the form of a two custom arrays:

CDocTerm—Contains each unique term/phrase from the input text, the final term score, number of occurrences in the input text, each sentence index that the term occurred in, and the term's base score.

Annotation—Contains an offset, length, and annotation type. In this case, the annotation array contains the location of each sentence within the input text.

The Document Summarizer 312 produces output data in the form of a string (e.g., a C# string) that contains an abstract of the five highest scoring (most relevant) sentences provided.

The Token Controller 314 is a highly parallel producer/consumer pipeline that that can be used to produce an Abstract and a custom Scored Text Annotation data structure that contains all keyword phrase final scores (Known Words Base Scores weighted with frequency of occurrence). A Token Controller 314 cannot be created without providing it a Known Words object to use during processing.

The Token Controller 314 creates a Sentence Parser 302, Noun Parser 304, Term Scorer 310, and Document Summarizer 312 during processing, and ties them together in a highly parallel producer/consumer pipeline that results in an Input Text abstract and a set of scored keywords.

The Token Controller 314 consumes input data in the form of string (e.g., a C# string) (e.g., as text data that has been loaded into memory up to 2 gigabytes in size).

The Token Controller 314 produces as output data, one or more of:

Abstract—a string (e.g., a C# string) that contains an Abstract for the provided text.

Scored Text Annotation—a data structure which contains each unique input text keyword, the keyword base score, keyword final score, number of occurrences in the document, sentence indexes for each sentence the keyword appears in, and a flag that is set to true if the keyword phrase contains any unknown words (words not contained in the Known Words List).

ULC Engine Process Interdependencies

Various ULC process interdependencies are noted here, and can be seen, e.g., in FIG. 3.

The ULC Sentence Parser 302 is dependent on a provided block of input text.

The ULC Noun Parser 304 is dependent on a blocking collection of Sentence Text data structures typically provided by the ULC Sentence Parser 302.

The ULC Known Words object 306 is dependent on a Known Words list 326. The object attempts to load a default list if a Known Words list is not provided by the caller.

The ULC Known Words CUD 308 object is dependent on a reference to the Known Words object 306 and cannot be created without it.

The ULC Term Scorer 310 is dependent on a blocking collection of Term Text data structures typically provided by the ULC Noun Parser 304.

Since the Term Scorer 310 is dependent on Term Text data structures typically provided by the ULC Noun Parser 304, it is also dependent on the Sentence Parser 302, by default.

The ULC Term Scorer 310 cannot score Terms without a Known Words list.

The ULC Document Summarizer 312 is dependent on a list of scored terms from all sentences in the input text and sentence annotations that provide the location of each sentence within the input text. These inputs are produced by the Token Controller 314.

The Document Summarizer 312 is dependent on all Token Controller 314 dependencies including the Sentence Parser 302, Noun Parser 304, Known Words object, Term Scorer 310, and Document Summarizer 312.

The ULC Token Controller 314 is dependent on input text, the Sentence Parser 302, Noun Parser 304, Known Words object 306, Term Scorer 310, and Document Summarizer 312.

ULC Sentence Parser

Figure 4:
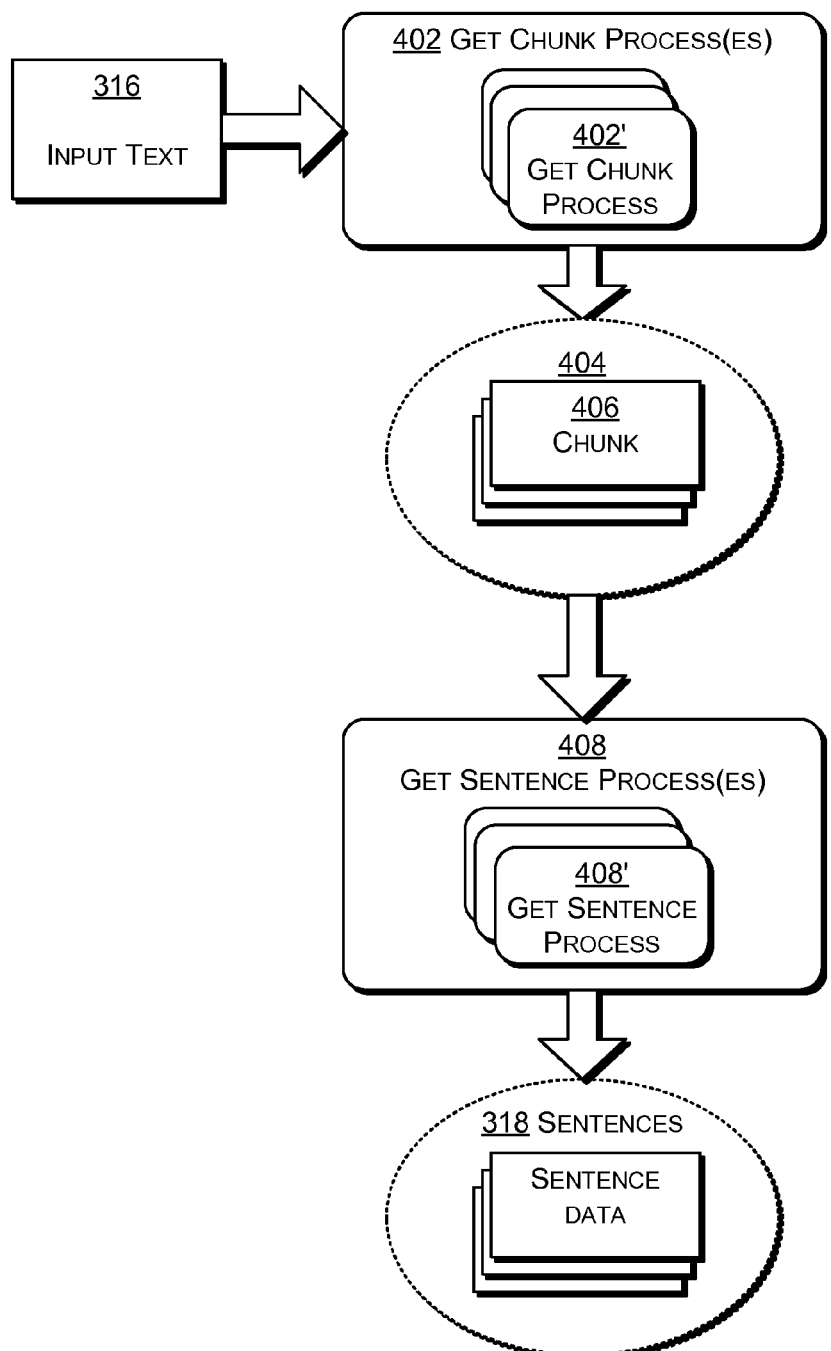

The ULC Sentence Parser 302 is described with reference to FIGS. 3-4. The Sentence Parser 302 process identifies each sentence in a provided block of input text.

The ULC Sentence Parser 302 consumes input data in the form of a string and produces a Sentence Text data structure for each sentence identified during this process. An example Sentence Text data structure 602 is shown in FIG. 6, and includes the following fields:

Index 604—The starting position of the sentence within the input text block.

Text 606—The actual sentence.

Word Count 608—The total number of words in the sentence.

No Comma Capitalized Word Count 610—The number of words in the sentence which are capitalized and are not immediately preceded by a comma.

Special Character Count 612—The number of characters in the sentence which are not letters, numbers, or whitespace characters.

The following table shows part of an exemplary Sentence Text data structure in C# corresponding to the data structure shown in FIG. 6(*a*).

```
public struct Sentence Text
{
public int Index;
public string Text;
public double WordCount;
public double NoCommaCapitalizedWordCount;
public int SpecialCharacterCount;
}
```

Sentence Parser Process Definitions

Sentence Producer

The ULC Sentence Parser 302 is started and managed via the Sentence Producer Process. The Sentence Producer is executed in parallel. This process can consume up to 1,024 concurrent threads on a typical personal desktop machine, and it should be appreciated that the thread pool count changes based on upon the number of processors, memory, and other processes which may be occurring on machine executing the Sentence Producer process. In a current C# implementation, thread pools and thread counts are managed by the C# "Parallel" object class. The ULC Sentence Parser 302 consumes input text using the Get Chunk process(es) 402 (FIG. 4) and returns collections of sentences from the input text that are basically similar in size.

A single C# Concurrent Bag is used to create/define the holding structure for the new Blocking Collection 318 of ULC custom Sentence Text data structures. This is important since a C# ConcurrentBag object is designed for parallel/thread safe access in no particular order whatsoever. It is the most efficient C# structure choice for this task for at least the following reasons:

Multiple sentence producers can add Sentence Text items to the bag simultaneously.

Multiple sentence consumers can also request Sentence Text items from the bag simultaneously for further downstream processing.

All Sentence Text consumers process Sentence Text items in no particular order using the Concurrent Bag. This allows for the highest degree of parallel processing optimization and speed.

Sentence Text items (chunk or individual sentence) do contain an index which allows them to be sorted according to their original order within the input text. This is critical since the Concurrent Bag and parallel process ignore order in exchange for speed.

While other data structures and systems may be used, those of skill in the art will realize and understand, upon reading this description, that the implementation should support a high degree of parallelism and concurrency.

Multiple sentence producer threads simultaneously request chunks 406 from the Get Chunk process 402. In addition, Get Chunk process 402 (described below) uses an asynchronous "Yield Return" operation for each chunk 406 of text that it finds. This means that when Get Chunk process 402 has identified a valid chunk of text, it's process yields control and returns/exposes that chunk 406 to any other requesting/calling threads for further simultaneous (i.e., multi-threaded) processing.

Once each parallel thread in the Sentence Producer has received a chunk 404 of sentence text, that thread begins to break the chunk 406 into individual sentences by calling the Get Sentences process(es) 408. Each sentence identified within each chunk from each thread is then "Yield Returned" once again from the Get Sentences process 408. All Sentence Producer threads add their valid sentences in the form of a Sentence Text data structure to the same Blocking Collection (Sentences 318) which is immediately exposed to any downstream thread/process which consumes Sentence Text data.

Once all input data has been broken into chunks, all chunks have been broken into sentences, and all sentences have been added to the asynchronously returned Blocking Collection of Sentence Text data items, the Sentence Producer process marks the Blocking Collection of Sentence Text data items as "complete". This signals to all other Sentence Text consumer processes/threads that no more Sentence Text data items will be added to the collection.

Sentence Text consuming processes/threads finalize processing when their Blocking Collection of Sentence Text data items is marked as complete and there are no more Sentence Text chunk items left in the collection to be processed.

Sentence Text consuming processes/threads will block or wait in the event that no more Sentence Text chunk data items are left in the collection to be processed and the collection is not marked as complete. This implies that Sentence Text producer threads/processes are producing Sentence Text items slower than Sentence Text consuming processes/threads are consuming them.

The Get Chunk process

The Get Chunk process 402 skips a number (X) of input text characters and then begins to look (one character at a time) for a valid sentence ending. The number X of characters to skip is defined by an input parameter (ChunkLength), and the default is 250 characters). This process only breaks up the text into chunks for the benefit of parallel processing by breaking at the first valid sentence ending that meets the following criteria:

The current character is a period ".".
The next character is whitespace.
The 2nd previous character is not whitespace (filter's possible initials)
One of the next 2 characters after the whitespace following the period is an uppercase letter.

It should be appreciated that these rules are not designed to identify every valid sentence ending, but only the most common sentence endings. The process ensures that an individual sentence is never split between two chunks.

Once a chunk of sentences has been identified by Get Chunk 402, the process "yield returns" that chunk exposing it as part of an IEnumerable (forward only, read only, for each eligible collection) of Sentence Text items that is asynchronously available to other downstream Sentence Text consumers, (in this case multiple parallel threads created by the Sentence Producer) which are passing each chunk to the Get Sentences process.

It is also important to note that the starting position of each chunk within the input text is attached within the Sentence Text data structure that is returned. This initial index is used by the Get Sentences process 408 to determine the starting index of each individual sentence, and this allows all sentences processed by all threads to easily be sorted in their original order when needed.

the Get Sentences Process

The Get Sentences process 408 receives a Sentence Text data structure as input that contains a chunk of sentences produced by the Get Chunk process 402. The Get Chunk process 402 has also attached the starting position of the Sentence Text chunk within the original input text block as the index of the Sentence Text data item.

Once an individual sentence has been identified by Get Sentences process 408, the process "yield returns" that sentence exposing it as part of an IEnumerable (forward only, read only, for each eligible collection) of Sentence Text items that is asynchronously available to other downstream Sentence Text consumers, (in this case multiple parallel threads created by the Sentence Producer) which are passing each sentence (as a Sentence Text data item) into a parallel/thread safe Blocking Collection of sentence text items.

The Get Sentences process 408 process examines each Sentence Text chunk of sentences one character at a time breaking the chunk into individual sentences. While each character is being examined, the Get Sentences process 408 tracks items about each sentence that are critical to later downstream processes such as:

Index—The starting position of each sentence within the input text block is calculated by taking the starting position of each chunk (provided by the Get Chunk process) and adding it to the starting position of the each individual sentence within the each chunk.

Word Count—The total number of words in the sentence.

No Comma Capitalized Word Count—The number of words in the sentence which are capitalized and are not immediately preceded by a comma. This count is used to identify lists, links, or tags (very common in web pages) that are not actually sentences. For example, (Home|Video|News Pulse|U.S.|World|Politics|Justice|Entertainment|Tech|Health|Living) would produce a No Comma Capitalized Word Count of 10 (first word of a sentence is not counted). However, the sentence "My favorite topics are Home, Video, News Pulse, U.S., World, Politics, Justice, Entertainment, Tech, Health, and Living." would produce a No Comma Capitalized Word Count of zero since commas are used before each word.

Special Character Count—The number of characters in the sentence which are not letters, numbers, or whitespace characters.

Tracking these items at the character level during sentence parsing adds no real overhead to the process. Although the Get Sentences process 408 uses a read-only, forward only for each enumerator to examine each character in a chunk, it also keeps track of its position within a chunk of sentences using a simple position index. The position is incremented during each iteration of the loop. The C# for each command is presently considered to be the fastest way to iterate through a collection of characters. However, it is important to note that the Get Sentences process 408 exploits the fact that in a particular C# implementation, strings can also be treated as Character Arrays which are accessible using an index. This means that during processing when specific conditions are met, Get Sentences process 408 uses the InputText.Text[position−n] or InputText.Text[position+n] style syntax to look both forwards and backwards from the current character position during a highly efficient forward only iteration.

The Get Sentences process 408 keeps track of multiple items during sentence chunk character processing to successfully identify sentence breaks. Boundary Characters represent characters that the Get Sentences process 408 identifies as sentence endings when certain conditions are met. Get Sentences Boundary Characters include ".", "?", "!", "•" (bullet character), and ":". Those of skill in the art will realize and understand, upon reading this description, that different and/or other boundary characters may be used. The Get Sentences process 408 treats all bullet points as sentence boundaries and treats colons ":" as sentence boundaries when they are followed by whitespace and then a capital letter. The Get Sentences process 408 also keeps track of various Token characteristics. Within the context of the Get Sentences process 408, any collection of characters separated by whitespace is considered a Token. Within a Token, non-alpha characters, vowels, and character count all impact when sentences are ended.

In a present implementation the following rules apply to the word (or grouping of characters) directly before a valid sentence ending character ('.', '?', '!', '•', ':'):

Do not break a sentence, if the word prior to boundary character is only one character long. This is considered an initial or abbreviation. This rule is applicable in most cases, however it fails in the following example: "The letter I am thinking of is X."

Do not break a sentence, if the character that is two characters prior to the current position is a period. This is considered an initial.

If the word prior to boundary character has no vowels, it is an abbreviation.

Break sentences for all bullets with no additional checks.

Break sentences for all tokens that contain non-alpha characters.

Do not break a sentence, with a letter or number directly after the period. (i.e. X.X)

Do not break a sentence, if the next token begins with a lower case letter.

A valid sentence must be proceeded by at least one space which occurs after the sentence boundary character.

A valid sentence must begin with a number, capital letter, or with a " or ' character that is proceeded by a space.

Do not break sentences in the middle of marked text blocks. (This is a marked block) or [this], {this}, 'this', "this" etc.

Those of skill in the art will realize and understand, upon reading this description, that different and/or other rules may be used.

In a presently preferred implementation, vowels and marked text blocks are determined by class level C# HashSets which are hardcoded within the Sentence Parser class. The following list contains variables tracked during character level processing:

lastBoundaryCharPos—contains the last position in the sentences chunk that a boundary character was identified.

lastBoundaryChar—contains the last boundary character that was identified sentenceStartPos—Starting position of the current sentence. This is set after each sentence is output using the current position of the GetSentences position index.

sentenceEndFlag—A Boolean value (true or false) which indicates if a sentence ending has occurred.

position—contains GetSentences current position within the sentence chunk.

vowelFlag—true or false if the current Token contains a vowel.

nonAlphaFlag—true or false if the current Token contains a non-alpha character lastChar—Contains the character processed during previous the loop iteration.

lastCharNoWhitespace—Contains the character processed during previous the loop iteration excluding whitespace.

inSkipBlock—All Boundary Characters and rules are ignored during a SkipBlock. A SkipBlock occurs when a BlockOpening character is encountered. {'(', '{', '[', '\"', '"', '<'}

BlockVal—The character required to end a current SkipBlock.

lastSpacePos—The position index value of the last space character encountered.

NextWord—(true or false) Set to True each time a whitespace character is encountered, then set to False when the very next letter or digit is encountered.

This variable also triggers resetting of the vowelFlag, nonAlphaFlag, and increments the WordCount each time it is set to false.

Once a valid sentence boundary has been detected, the Get Sentences process 408 sends the actual sentence text through a Clean Text process. The CleanText process supports the GetSentences process by removing all duplicate spaces and control characters from a provided C# string. The process then "yield returns" the single Sentence Text item exposing it as part of an IEnumerable (forward only, read only, for each eligible collection) of Sentence Text items that is asynchronously available to other downstream Sentence Text consumers, (in this case multiple parallel threads created by the Sentence Producer) which are passing each Sentence Text back to the Sentence Producer's calling process.

Those of skill in the art will realize and understand, upon reading this description, that different approaches to sentence parsing (e.g., based on Hidden Markov Models) may be used. However, the Hidden Markov Models performance was substantially slower than the approach detailed above. The Sentence Parser class works optimally only with well-formed English. Errors in capitalization and unbalanced SkipBlocks (i.e. ", {, [ without",},]) will cause errors in sentence breaks. However, SkipBlocks are not interrogated at the GetChunk level. So, the maximum unbalanced sentence cannot exceed the length of the current chunk. SkipBlocks interrogation may be turned on an off as an additional parameter feature. In this scenario, when SkipBlocks are turned on, a maximum sentence length parameter should be identified or a scenario where once a maximum SkipBlocks length has been exceeded, the process goes back to the start of the unbalanced SkipBlock character and ignores it. Adding additional character boundary breaking rules have not impacted processing performance using this approach.

ULC Noun Parser Process

Figure 5:
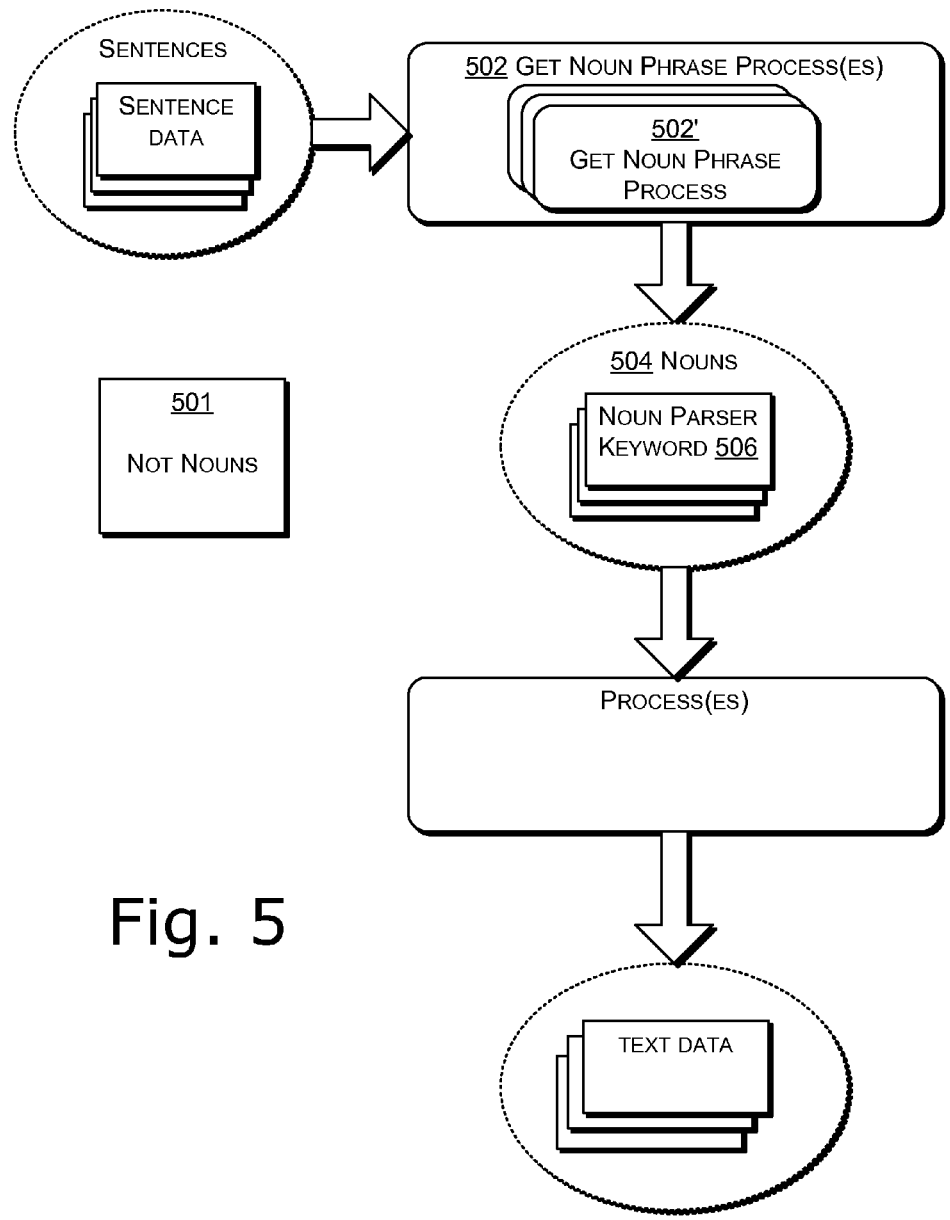

The ULC Noun Parser process 304 identifies relevant tokens, words, or phrases within a provided block of input text. With reference to FIGS. 3 and 5, the ULC Noun Parser process 304 consumes input data in the form of a C# Blocking Collection of Sentence Text data structures and produces one Term Text data structure for each token, word, or phrase identified during Sentence Text processing. The Term Text data structure contains the data collected for each Noun Parser Keyword identified during this process. An exemplary Term Text data structure 614 is shown in FIG. 7, in which:

Sentence Index 616 is an integer index which identifies which sentence the Noun Parser Keyword was identified from.

Term Index 618 is an integer index which identifies the keyword's location with the sentence text. This index can also be used to identify the order in which keywords were found within a document (collection of Sentence Text items).

Text 620 is the actual keyword identified by the Noun Parser. This is always a Noun Parser Token, Word, or Phrase.

Word Count 622 is the number of words contained in the Keyword.

Noun Parser Process Definitions

1. Noun Producer

The ULC Noun Parser 304 is started and managed via the Noun Producer Process. The Noun Producer is executed in parallel. This process can consume up to 1024 concurrent threads on a typical personal desktop machine, though it should be appreciated that the thread pool count changes based on upon the number of processors, memory, and other processes which may be occurring on machine executing the Noun Producer process. In a C# implementation, thread pools and thread counts are managed by the C# "Parallel" object class. The ULC Noun Parser consumes input text from Sentence Text data structures using the Get Noun Phrase By Char process 502 and returns collections 504 of Noun Parser Keywords 506 from the input text (i.e. sentences) via the Term Text data structure.

A single C# ConcurrentBag may be used to create/define the holding structure for the new Blocking Collection of ULC custom Term Text data structures. This is very important since a C# ConcurrentBag object is designed for parallel/thread safe access in no particular order whatsoever. It is presently considered to be the most efficient C# structure choice for this task.

While Those of skill in the art will realize and understand, upon reading this description, that different and/or other approaches can be used, the following are considered desirable in order to achieve high degrees of parallelism and concurrency: Multiple noun producers can add Term Text items to the bag simultaneously. Multiple noun consumers can also request Term Text items from the bag simultaneously for further downstream processing. All Term Text consumers process Term Text items in no particular order using the ConcurrentBag. This allows for the highest degree of parallel processing optimization and speed. Term Text items do contain an index which allows them to be sorted according to their original order within the input text. This is critical since the ConcurrentBag and parallel process ignore order in exchange for speed.

Multiple noun producer threads simultaneously request Sentence Text items from the Noun Producer process input. In addition, GetNounPhraseByChar (described below) uses an asynchronous "Yield Return" operation for each keyword that it finds within these Sentence Text items. This means that when GetNounPhraseByChar has identified a valid keyword, it's process yields control and returns/exposes that keyword to any other requesting/calling threads for further simultaneous (i.e. multi-threaded) processing. All Noun Producer threads add their valid Keywords in the form of a Term Text data structure to the same Blocking Collection (bcNouns) which is immediately exposed to any downstream thread/process which consumes Term Text data.

Once all input sentences have been broken into Keywords and all Keywords have been added to the asynchronously returned Blocking Collection of Term Text data items (bc-Nouns), the Noun Producer process marks the Blocking Collection of Term Text data items as "complete". This signals to all other Term Text consumer processes/threads that no more Term Text data items will be added to the collection.

It is important to note that the Noun Producer takes a C# Blocking Collection of Sentence Text data structures as process input. This collection is simultaneously accessed by both multiple Sentence Text producer threads (typically the Sentence Producer process adding new Sentence Text data) and multiple Sentence Text consumer threads (typically the Noun Producer process removing Sentence Text data) from the input collection.

The Noun Producer Sentence Text consuming processes/threads finalize processing when their Blocking Collection of Sentence Text data items is marked as complete and there are no more Sentence Text items left in the collection to be processed.

Noun Producer Sentence Text consuming processes/threads will "block" or wait in the event that no more Sentence Text data items are left in the collection to be processed and the collection is not marked as "complete". (This implies that Sentence Text producer threads/processes are producing Sentence Text items slower than Term Text consuming processes/threads are consuming them.

The Noun Producer also continues to produce Term Text data items for each of the Keywords identified in a Sentence Text data item until the input Blocking Collection of Sentence Text data items is marked as complete and there are no more Sentence Text items left in the collection to be processed.

2. Not Nouns List—Import not Nouns

The ULC Noun Parser process 304 relies on an input list of "Not Nouns" (501 in FIG. 5) in order to perform keyword identification. As used herein, a "Not Noun" is any word who's predominate usage in the language is not as a noun. It should be appreciated that this definition may not be applicable to all languages, but it is considered applicable to the English language. In addition, the Not Noun List 501 may also include words that are determined by a provider to be treated as "exclusion" words during Noun Parser keyword identification. In a present implementation, the ULC Not Nouns List 501 includes approximately 52,000 unique exclusion words. Examples of good Not Nouns List exclusion candidate words include words such as "it", "and", "the", "a", and most words ending in "ly", "ing", "ed", etc. Again, those of skill in the art will realize and understand, upon reading this description, that these rules are language specific and the ones described are applicable to the English language. It should be appreciated that use of a Not Nouns List of exclusion words provides an optimization for the parser, and that the keywords identified during Noun Parser processing are only as good as the Noun Parser's Not Nouns List of exclusion words.

When a Noun Parser object is created, a location for the Not Nouns List is required and the Not Nouns List is loaded into memory, preferably into a Hash Table in memory.

For a present implementation, the ULC Not Nouns list was created using a database of word frequencies from the Brigham Young University Corpus of Contemporary American English (the "COCA list"). The database includes approximately 500,000 unique words and usage frequencies by part of speech across 43 different categories of literature. The COCA list includes word frequencies by unique word and part of speech for 425 million scanned words in literature ranging from 1990-2011. At the time of this writing the COCA list is available at. http://corpus.byu.edu/coca/.

The following table lists the POS Categories Included in the COCA Database:

| POS | POS Text |
|---|---|
| APPGE | possessive pronoun, pre-nominal (e.g. my, your, our) |
| AT | article (e.g. the, no) |
| AT1 | singular article (e.g. a, an, every) |
| BCL | before-clause marker (e.g. in order (that), in order (to)) |
| CC | coordinating conjunction (e.g. and, or) |
| CCB | subordinating conjunction (e.g. if, because, unless, so, for) |
| CSA | as (as conjunction) |
| CSN | than (as conjunction) |
| CST | that (as conjunction) |
| CSW | whether (as conjunction) |
| DA | after-determiner or post-determiner capable of pronominal function (e.g. such, former, same) |
| DA1 | singular after-determiner (e.g. little, much) |
| DA2 | plural after-determiner (e.g. few, several, many) |
| DAR | comparative after-determiner (e.g. more, less, fewer) |
| DAT | superlative after-determiner (e.g. most, least, fewest) |
| DB | before determiner or pre-determiner capable of pronominal function (all, half) |
| DB2 | plural before-determiner (both) |
| DD | determiner (capable of pronominal function) (e.g. any, some) |
| DD1 | singular determiner (e.g. this, that, another) |
| DD2 | plural determiner (these, those) |
| DDQ | wh-determiner (which, what) |
| DDQGE | wh-determiner, genitive (whose) |
| DDQV | wh-ever determiner, (whichever, whatever) |
| EX | existential there |
| FO | formula |
| FU | unclassified word |
| FW | foreign word |

-continued

POS Categories Included in the COCA Database

| POS | POS Text |
|---|---|
| GE | Germanic genitive marker-(' or's) |
| IF | for (as preposition) |
| II | general preposition |
| IO | of (as preposition) |
| IW | with, without (as prepositions) |
| JJ | general adjective |
| JJR | general comparative adjective (e.g. older, better, stronger) |
| JJT | general superlative adjective (e.g. oldest, best, strongest) |
| JK | catenative adjective (able in be able to, willing in be willing to) |
| MC | cardinal number, neutral for number (two, three . . . ) |
| MC1 | singular cardinal number (one) |
| MC2 | plural cardinal number (e.g. sixes, sevens) |
| MCGE | genitive cardinal number, neutral for number (two's, 100's) |
| MCMC | hyphenated number (40-50, 1770-1827) |
| MD | ordinal number (e.g. first, second, next, last) |
| MF | fraction, neutral for number (e.g. quarters, two-thirds) |
| ND1 | singular noun of direction (e.g. north, southeast) |
| NN | common noun, neutral for number (e.g. sheep, cod, headquarters) |
| NN1 | singular common noun (e.g. book, girl) |
| NN2 | plural common noun (e.g. books, girls) |
| NNA | following noun of title (e.g. M.A.) |
| NNB | preceding noun of title (e.g. Mr., Prof.) |
| NNL1 | singular locative noun (e.g. Island, Street) |
| NNL2 | plural locative noun (e.g. Islands, Streets) |
| NNO | numeral noun, neutral for number (e.g. dozen, hundred) |
| NNO2 | numeral noun, plural (e.g. hundreds, thousands) |
| NNT1 | temporal noun, singular (e.g. day, week, year) |
| NNT2 | temporal noun, plural (e.g. days, weeks, years) |
| NNU | unit of measurement, neutral for number (e.g. in, cc) |
| NNU1 | singular unit of measurement (e.g. inch, centimetre) |
| NNU2 | plural unit of measurement (e.g. ins., feet) |
| NP | proper noun, neutral for number (e.g. IBM, Andes) |
| NP1 | singular proper noun (e.g. London, Jane, Frederick) |
| NP2 | plural proper noun (e.g. Browns, Reagans, Koreas) |
| NPD1 | singular weekday noun (e.g. Sunday) |
| NPD2 | plural weekday noun (e.g. Sundays) |
| NPM1 | singular month noun (e.g. October) |
| NPM2 | plural month noun (e.g. Octobers) |
| PN | indefinite pronoun, neutral for number (none) |
| PN1 | indefinite pronoun, singular (e.g. anyone, everything, nobody, one) |
| PNQO | objective wh-pronoun (whom) |
| PNQS | subjective wh-pronoun (who) |
| PNQV | wh-ever pronoun (whoever) |
| PNX1 | reflexive indefinite pronoun (oneself) |
| PPGE | nominal possessive personal pronoun (e.g. mine, yours) |
| PPH1 | 3rd person sing. neuter personal pronoun (it) |
| PPHO1 | 3rd person sing. objective personal pronoun (him, her) |
| PPHO2 | 3rd person plural objective personal pronoun (them) |
| PPHS1 | 3rd person sing. subjective personal pronoun (he, she) |
| PPHS2 | 3rd person plural subjective personal pronoun (they) |
| PPIO1 | 1st person sing. objective personal pronoun (me) |
| PPIO2 | 1st person plural objective personal pronoun (us) |
| PPIS1 | 1st person sing. subjective personal pronoun (I) |
| PPIS2 | 1st person plural subjective personal pronoun (we) |
| PPX1 | singular reflexive personal pronoun (e.g. yourself, itself) |
| PPX2 | plural reflexive personal pronoun (e.g. yourselves, themselves) |
| PPY | 2nd person personal pronoun (you) |
| RA | adverb, after nominal head (e.g. else, galore) |
| REX | adverb introducing appositional constructions (namely, e.g.) |
| RG | degree adverb (very, so, too) |
| RGQ | wh-degree adverb (how) |
| RGQV | wh-ever degree adverb (however) |
| RGR | comparative degree adverb (more, less) |
| RGT | superlative degree adverb (most, least) |
| RL | locative adverb (e.g. alongside, forward) |
| RP | prep. adverb, particle (e.g. about, in) |
| RPK | prep. adv., catenative (about in be about to) |
| RR | general adverb |
| RRQ | wh-general adverb (where, when, why, how) |
| RRQV | wh-ever general adverb (wherever, whenever) |
| RRR | comparative general adverb (e.g. better, longer) |
| RRT | superlative general adverb (e.g. best, longest) |
| RT | quasi-nominal adverb of time (e.g. now, tomorrow) |
| TO | infinitive marker (to) |
| UH | interjection (e.g. oh, yes, um) |
| VB0 | be, base form (finite i.e. imperative, subjunctive) |
| VBDR | were |
| VBDZ | was |
| VBG | being |
| VBI | be, infinitive (To be or not . . . It will be . . . ) |
| VBM | am |
| VBN | been |
| VBR | are |
| VBZ | is |
| VDO | do, base form (finite) |
| VDD | did |
| VDG | doing |
| VDI | do, infinitive (I may do . . . To do . . . ) |
| VDN | done |
| VDZ | does |
| VHO | have, base form (finite) |
| VHD | had (past tense) |
| VHG | having |
| VHI | have, infinitive |
| VHN | had (past participle) |
| VHZ | has |
| VM | modal auxiliary (can, will, would, etc.) |
| VMK | modal catenative (ought, used) |
| VV0 | base form of lexical verb (e.g. give, work) |
| VVD | past tense of lexical verb (e.g. gave, worked) |
| VVG | -ing participle of lexical verb (e.g. giving, working) |
| VVGK | -ing participle catenative (going in be going to) |
| VVI | infinitive (e.g. to give . . . It will work . . . ) |
| VVN | past participle of lexical verb (e.g. given, worked) |
| VVNK | past participle catenative (e.g. bound in be bound to) |
| VVZ | -s form of lexical verb (e.g. gives, works) |
| XX | not, n't |
| ZZ1 | singular letter of the alphabet (e.g. A, b) |
| ZZ2 | plural letter of the alphabet (e.g. A's, b's) |

The following is a list Literature Categories Included in the current COCA Database: (in the following table: SPOK=Spoken; FIC=Fiction; MAG=Magazines; NEWS=Newspaper; ACAD=Academic):

Literature Categories Included in the current COCA Database

SPOK__ABC
SPOK__NBC
SPOK__CBS
SPOK__CNN
SPOK__FOX
SPOK__MSNBC
SPOK__PBS
SPOK__NPR
SPOK__Indep
FIC__Gen__Book
FIC__Gen__Jrnl
FIC__SciFi__Fant
FIC__Juvenile
FIC__Movies
MAG__News__Opin
MAG__Financial
MAG__Sci__Tech
MAG__Soc__Arts
MAG__Religion
MAG__Sports
MAG__Entertain
MAG__Home__Health
MAG__Afric__Amer
MAG__Children
MAG__Women__Men
NEWS__Misc -continued Literature Categories Included in the current COCA Database NEWS_News_Intl
NEWS_News_Natl
NEWS_News_Local
NEWS_Money
NEWS_Life
NEWS_Sports
NEWS_Editorial
ACAD_History
ACAD_Education
ACAD_Geog_SocSci
ACAD_Law_PolSci
ACAD_Humanities
ACAD_Phil_Rel
ACAD_Sci_Techl
ACAD_Medicine
ACAD_Misc The following describes the process of creating the Not Nouns List. Using raw data from the COCA list, a ULC Custom Not Nouns list was created using the following steps:

Step 1—Short POS Totals

Sum all word frequencies grouping them by unique word and the first character of the each unique part of speech.

SELECT [500 kGenre].Word, Mid([POS],1,1) AS [Short POS]
, Sum([500 kGenre].Total) AS SumOfTotal
FROM 500 kGenre
GROUP BY [500 kGenre].Word, Mid([POS],1,1);

Step 2—Max Total By Word

Get each unique word from Step 1 and the largest first POS Character frequency total from step 1. The character frequency total equals the sum of all category frequency totals for each unique word/pos combination.

SELECT [Step 1—Short POS Totals].Word
, Max([Step 1—Short POS Totals].SumOfTotal) AS MaxOfSumOfTotal
FROM [Step 1—Short POS Totals]
GROUP BY [Step 1—Short POS Totals].Word;

Step 3—Words Most Used As Nouns

Make of list of unique words that are most commonly used as Nouns. (i.e. the word's largest first POS Character total from step 2 matches a value of "N" in Step 3.

SELECT [Step 1—Short POS Totals].Word
, [Step 1—Short POS Totals].[Short POS]
FROM [Step 2—Max Total By Word] INNER JOIN [Step 1—Short POS Totals]
ON ([Step 2—Max Total By Word].MaxOfSumOfTotal= [Step 1—Short POS Totals].SumOfTotal)
AND ([Step 2—Max Total By Word].Word=[Step 1—Short POS Totals].Word)
WHERE ((([Step 1—Short POS Totals].[Short POS])="N"));

Step 4—Create the Not Nouns List:

Get all unique words from the COCA database that are not on the list created in Step 3. In addition, exclude all words that contain non-alpha characters (are not real words).

SELECT [500 kGenre].Word INTO [Not Nouns]
FROM [Step 3—Words Most Used As Nouns]
RIGHT JOIN 500 kGenre
ON [Step 3—Words Most Used As Nouns].Word=[500 kGenre].Word
WHERE ((([Step 3—Words Most Used As Nouns].Word) Is Null))
GROUP BY [500 kGenre].Word
HAVING ((([500 kGenre].Word) Not Like "*.*" And ([500 kGenre].Word) Not Like "*0*" And ([500 kGenre].Word) Not Like "*1*" And ([500 kGenre].Word) Not Like "*2*" And ([500 kGenre].Word) Not Like "*3*" And ([500 kGenre].Word) Not Like "*4*" And ([500 kGenre].Word) Not Like "*5*" And ([500 kGenre].Word) Not Like "*6*" And ([500 kGenre].Word) Not Like "*7*" And ([500 kGenre].Word) Not Like "*8*" And ([500 kGenre].Word) Not Like "*9*" And ([500 kGenre].Word) Not Like "*!*" And ([500 kGenre].Word) Not Like "*@*" And ([500 kGenre].Word) Not Like "*$*" And ([500 kGenre].Word) Not Like "*%*" And ([500 kGenre].Word) Not Like "*^*" And ([500 kGenre].Word) Not Like "*&*" And ([500 kGenre].Word) Not Like "*(*" And ([500 kGenre].Word) Not Like "*)*" And ([500 kGenre].Word) Not Like "*-*" And ([500 kGenre].Word) Not Like "*_*" And ([500 kGenre].Word) Not Like "*+*" And ([500 kGenre].Word) Not Like "*=*" And ([500 kGenre].Word) Not Like "*~*" And ([500 kGenre].Word) Not Like "*/*" And ([500 kGenre].Word) Not Like "*\*" And ([500 kGenre].Word) Not Like "*:*" And ([500 kGenre].Word) Not Like "*[#]*" And ([500 kGenre].Word) Not Like "*[*]*"));

3. GetNounPhraseByChar

The GetNounPhraseByChar process takes input text and a sentence index (typically from a Sentence Text data structure provided by the Sentence Parser via the Noun Producer) as input and produces zero to many keywords from the input sentence.

Once an individual keyword has been identified by GetNounPhraseByChar, the process "yield returns" that keyword exposing it as part of an IEnumerable (forward only, read only, for each eligible collection) of Term Text items that is asynchronously available to other downstream Term Text consumers, (in this case multiple parallel threads created by the Noun Producer) which are passing each Keyword (as a Term Text data item) into a parallel/thread safe Blocking Collection of Term Text items (bcNouns).

The GetNounPhraseByChar process examines each sentence input text one character at a time breaking the sentence into individual Keywords. While each character is being examined, the GetNounPhraseByChar process tracks items about each Keyword that are critical to later downstream processes such as:

SentenceIndex—The sentence index can be used to identify the specific sentence in which a Keyword occurs. Also identifies the order in which all keywords were identified within the input text with combined with the TermIndex.

TermIndex—Location of a specific Keyword within a sentence. Also identifies the order in which all keywords were identified within the sentence.

WordCount—The number of words contained in the Term Text Text.

It is important to note that the Input Text processed by GetNounPhraseByChar are not required to be well formed sentences, and there is no real maximum or minimum length imposed by this sub-process. However, GetNounPhraseByChar will attempt to identify word phrases across all text included in the input text with no regard to parts of speech, line breaks, bullets, sentence boundaries etc. This means that if multiple sentences were passed as input text to GetNounPhraseByChar, the process could possibly return a phrase that spanned across any of the logical thought/text boundaries described above. However, GetNounPhraseByChar can also be used to process large amounts of unformatted text that includes no boundaries for phrases when needed (web page tags/topic lists/random unformatted notes for example).

GetNounPhraseByChar assumes that each block of input text provided has been divided into single blocks of logical thought from which Keywords can be extracted. Input Text should not include more than one sentence or more than one block of logical text per execution.

GetNounPhraseByChar begins by first calling the FirstToLastLetterOrNumber process to get rid of any leading or following non-alpha numeric characters (i.e. periods at end of sentences) from the input text. After this, the process loops through each character of the remaining input text keeping track of its current position within the forward only/read-only for each iteration. Relative position tracking gives GetNounPhraseByChar the ability to identify the exact position where each Keyword is identified. In addition, GetNounPhraseByChar could look both forwards and backwards in the input text to interrogate characters, if needed. However, the process does not currently require this functionality.

The following list contains all variables tracked during character level processing:
- phrase—A collection of consecutive words identified by the GetNounPhraseByChar process within the input text that do not appear on the Not Nouns List.
- Word—Any collection of characters identified that are delimited by whitespace characters.
- lastCharIsNumber—(true or false) Indicates if the last character reviewed was numeric. This is not currently used in the process, but can be used to identify numbers in the future.
- containsNonAplha—(true or false) Indicates if the current word contains a non-alpha character. Non-word terms are not included in phrases.
- breakPhrase—(true or false) Indicates if the current phrase should be output.
- pos—Contains current input text character position during processing.
- phraseWordCount—number of words contained in the current phrase.

Word identification during character level processing occurs using the following rules:

Non-Whitespace Character Processing
- If the current character is not whitespace, add it to the current Word buffer.
- If the character is not a letter, set containsNonAplha=true.

Whitespace Character Processing
- If the current character is whitespace and the Word buffer length >0
- Send the Word through the CleanWord process to remove any 's from the word and removes any non-letter or non-number characters from the beginning and end of the word, includePeriod=false (do not remove a period from the end of a word that qualifies as an initial and happens to be at the end of a sentence).
- When The Word contains nonApha characters
- Send the Word through the CleanWord process to remove any 's from the word and removes any non-letter or non-number characters from the beginning and end of the word, includePeriod=true (remove periods from the end of all words).
- If the value in Word qualifies as an initial, add it to the current phrase (including trailing period) and continue processing. (Words that end in periods and are preceded 2 characters by whitespace or another period treated as initials.)
- If the value in Word does not qualify as an initial, "yield return" a new Term Text data structure to the calling process (with trailing period removed). (Non-Alpha words cannot be included in keyword phrases)
- When The Word does not contain nonApha characters
- Look the word up in the Not Nouns List hash table. If the Word does not exist in the Not Nouns List hash table add it to the current Phrase.

The Word buffer is cleared and containsNonAplha is set to false after each whitespace. Phrases are broken after each whitespace only under some or all of the following conditions:
- The current Word exists on the Not Noun List
- The current Word is not a word (contains 1 or more numeric or non-alpha-numeric characters)
- The current character is any form of punctuation
- The current phrase can also be broken when it contains more than X words.

Noun Parser Conclusion

The Noun Parser rapidly identifies Keywords within the input text blocks provided via the Term Text data structure. Tokens identified by this process are any collection of characters or a single character delimited by whitespace. Keywords identified by this process represent any alpha only Tokens (words) that do not appear on the Not Nouns Exclusion List of words, OR any Token containing non-alpha characters (numbers, dates, URL's etc.).

The Noun Parser functions on the premise that English words with "no significant meaning" are created and exist much less frequently in the English Language than words with "significant meaning" (such as nouns). By developing a list of all non-significant words in the language, a highly parallel and efficient process can be created to quickly identify valuable keywords from text through a brute-force exclusion process. Using a customized Not Nouns List, each user can determine the specific words that should be excluded from keyword output during processing. In addition, the process could easily be modified to exclude non-alpha Tokens, numbers, dates, misspelled words, or any other additional word inclusions/exclusions that could be conceived by the user.

It is important to note that the ULC Engine does include a Known Words List in further downstream processes. This list is used to identify if any word or word contained in a phrase currently exists (is known) at the individual category level. Known/Unknown Words can easily be included or excluded from all downstream processes.

ULC Known Words Process

The ULC Known Words process 306 maintains a list of unique words and their frequency of occurrence across one to any number of Known Words Categories. When a Known Words object is created, a Known Words List is loaded into memory and used to determine a word's frequency of occurrence within each Known Words List Category. The ULC Engine currently utilizes the Known Words process for two primary functions:

1. Keyword Scoring—Known Words Base Scores are calculated for each Noun Parser Keyword that represent how rare that Keyword is within each specific Known Words category. Rare terms are given higher scores using the current base score algorithm.
2. Categorization—Known Words Category Penetration Scores are calculated for each document/block of input text processed by the ULC Engine. The Known Words process also has the ability to track Category Penetration Scores across any number of documents.

The ULC Known Words process 306 is always passed by reference as a "supporting process" to other classes/objects/processes that need either Known Words Base Scores, Known Words Category Penetration Scores, or both. However, it is important to note that both the process of producing a Known Words Base Scores (a measure of Keyword obscurity for a given category) and the process of categorization by generation and review of Known Words Category Penetration Scores are two distinct and separate processes. Both processes share in common only the need for categorization word frequencies contained within the Known Words List.

Since the ULC Engine scores the Keywords produced by the Noun Parser and also requires categorization scores for each block of input text processed through the engine, both processes (Base Scoring and Categorization) were consolidated to the same class to ensure that any given word and its associated category level frequencies are only accessed from the Known Words Word List one time for both processes.

However, in the instance that only Categorization was required for a particular use case, the Categorization process could easily be separated (and its categorization efficiency/throughput increased) from the current process arrangement. The requirements for both of these processes will be detailed separately later on in the section below.

In a present implementation the ULCWrapper class defines the Known Words List at the class level in the ULCWrapper. ULCWrapperConstructor region. In addition, the Load-KnownWords process is called during object creation in the same region.

When a ULCWrapper is created, the Known Words List is loaded via the ULCWrapper LoadKnownWords process (asynchronous loading optional). Since the ULC Engine's Default Known Words List contains 43 categories and approximately 236,000 Known Words, loading the file into memory takes about 5 seconds. The list can be loaded in a background process. However, no other processes which require the Known Words object (Scoring, Abstract Creation, Token Controller, or Categorization) can be used until loading is complete. Loading should only occur one time when the object is created. Keeping the object in memory eliminates I/O overhead from all subsequent processing and infinitely improves scoring and categorization response times.

Known Words Inputs

Base Scoring and Categorization processing both require the following inputs:

Token/Keyword/Keyword Phrase Input Text—During both Base Scoring and Categorization, the Known Words process requires one to many Tokens, Keywords, or Keyword Phrases in the form of a C# string (input text). Each input text item is then processed by looking up the words frequency of occurrence from each category contained in the current Known Words List.

Known Words List—A list of unique words and their frequency of occurrence across 1 to any number of Known Words Categories.

Known Words List Specifics

Known Words Token—Any collection of characters containing at least one non-alpha character that may have meaning for 1 to many categories in a Known Words List. (A Token is anything that is not a Word)

Keyword—Any collection of Alpha characters that makes a Word that may have meaning for 1 to many categories in a Known Words List.

KeyWord Phrase—Any collection of more than 1 consecutive occurring keyword within a block of input text.

Known Words List Special Keys—Keywords contained in the Known Words list that begins with the "~" character.

These entries contain list level data that can be used for special purposes other than the generation of Base and Category Scoring. For Instance, the Special Key "~SumAllKnownWords" is an entry in the Known Words List that contains the current sum total for each category's Keyword frequencies.

A Known Words list could contain any number of Tokens, Keywords, or Keyword Phrases. However, the current process has been optimized for efficiency by removing any KeyWord Phrases from the current Known Words List. This dramatically limits the total number of records contained within the Known Words List during processing. Since the list is loaded into an in memory hash table, reduction of list size/memory consumption is always a critical consideration.

Using a Single-Keyword-Only strategy all phrases are removed from (or never added to) the Known Words List. When a KeyWord Phrase is encountered in the current process, the phrase is always broken into individual Keyword components. Each Keyword is then looked up individually from the Known Words List and blended scores are calculated for both Base Scoring and Categorization (specifics below) from the individual Keyword components. The Single-Keyword-Only strategy removes many, many list entries through elimination of all duplicated keywords which may be contained in any number of keyword phrase permutation records.

One additional strategy to reduce Known Words List size would be to remove all words from the Known Words List that are included on the NotNouns List. This strategy operates successfully under two different scenarios.

Only Noun Parser Keywords are being given Known Words Category Penetration Scores. This means no word on the NotNouns list would ever be looked up on the Known Words List and are therefore unnecessary.

Word frequencies from words on the NotNouns list are deemed by the user to be irrelevant for categorization.

In an alternative strategy, a Known Words list could contain any type of entries, including phrases. Tokens are treated in the same manner as Keywords in the current implementation. However, the Known Words List could accommodate any type of entry keys and their related categorical frequencies that were indicative of that specific key's relevance to a category.

Known Words List Input File Sample (Text)

The Known Words List Input File can be loaded via a text flat file or a binary version of the Known Words file in which a Known Words List objects have been serialized using the Known Words supporting class KnownWordsSerialize which manages the native file format and creation of binary formatted Known Words Lists. When a Known Words list is saved in the native KnownWordsSerialize binary format, the list is about half the size it would be, if it were saved in a text flat file format. It also takes about half the time to load into memory from a binary formatted version.

Known Words Outputs

The Known Words process (CKnownWordsList object) produces output in the form of a custom KnownWordsScores data structure. Depending on how the Known Words process is accessed, the KnownWordsScores data structure can contain either Known Words Base Score results or Known Words Category Penetration Score results.

The KnownWordsScores data structure preferably contains the following data elements:

m_Scores—one score for each category in the Known Words List.

m_CatHigh—The category index number of the highest scoring category.

m_CatHighText—The category name for the highest scoring category.

m_CatHigh_Tie_Flag—(true or false) Set to true if the highest scoring category has a score tie with any other category.

m_CatLow—The category index number of the lowest scoring category.

m_CatLowText—The category name for the lowest scoring category.

m_CatLow_Tie_Flag—(true or false) Set to true if the lowest scoring category has a score tie with any other category.

m_sortedScores—Contains (category#, score, category text) sorted in descending order by score.

m_CategoryNames—Contains the names of each category by category index number.

Known Words Process Definitions

1. Known Words Process Creation (Constructor)

When a Known Words process is created, the creator has the option of providing it a file path to a custom Known Words List. This list can either be in the correct text flat file or correct binary file format.

If a provided Known Words List file exists, the provided Known Words List is used. Otherwise, the default Known Words List is used.

Once a Known Words List candidate has been identified, the Known Words process attempts to load the list via the Load process.

If a custom Known Words List load fails for any reason (typically if the file is not in the expected format), then the default list is loaded instead.

2. Known Words Load Process

The Known Words Load Process checks for a serialized version of the requested Known Words List. The LoadKnownWordsList process is then called with the serialized version of the requested file (if available), otherwise LoadKnownWordsList loads the text version of the file.

3. Known Words LoadKnownWordsList

The LoadKnownWordsList process either loads a binary Known Words List or calls the ImportKnownWordsFile process to load a text flat file version a Known Words list.

The supporting object KnownWordsSerialize is created anytime a binary version of the Known Words List needs to be created. KnownWordsSerialize uses the 3rd party open source ProtocolBuffers.Net library as a serialization engine for all its processes.

The KnownWordsSerialize process also manages saving the Known Words List to disk, and this functionality is exposed via the ULCWrapper class in the ULCWrapper.CategoryManagement region:

Once either a binary or text version has been loaded into memory, LoadKnownWordsList locates the Special Key record "~SumAllKnownWords" and loads it values into memory as m_iSumAllKnownWords. These values represent one total for all word frequencies contained in each Known Words List category.

The array m_1PctOfAllKnownWords is also created and represents a static value for each category. These values are only used for Known Words Base Score calculations and are returned anytime a requested keyword does not exist in the Known Words List. These static values represent each categories total word frequency*0.000122144863808477.

The static value 0.000122144863808477 is equivalent to $1/8,187$. This was the value or "weight" given to any word that did not exist in an original Known Words single total list.

Finally, each time a new Known Words List is loaded, the ResetCategoryTotals process is executed. All categorization tracking totals should be reset, if a new Known Words List is loaded since the frequency totals that drive accurate categorization may have changed.

It is very important to note that the Known Words Base Score calculation has nothing whatsoever to do with the process of Categorization or the Known Words Category Penetration Scoring Process. In this implementation both processes have been included in the same class to avoid duplicated access/lookups to the Known Words List word frequencies. In Addition, no word frequency totals from the original 8,187 word list are used in any ULC Engine processes.

In an alternate implementation, the process of categorization or Known Words Category Penetration Score calculation may be accomplished more efficiently/rapidly for documents, if all Known Words Base Score calculations were removed.

In a Categorization Only type of implementation, the Sentence Parser and Noun Parser may be replaced with only a word level parser, similar (or identical) to the KnownWordsWordParser process that is currently used to support Known Words learning Using the KnownWordsWordParser, every word in a document is extracted using the KnownWordsWordParser process and each word is processed for Known Words Category Penetration Scoring.

This type of implementation would likely be the most efficient way to categorize documents/input text, since all logic to identify sentence boundaries, identify Keywords, and score keywords would be eliminated. After this point, categorization process efficiency could only be further increased by skipping additional words during Known Words Category Penetration Scoring by removing them from the actual Known Word list. However, performance gains from this approach would be minimal since the actual list lookup would still be occurring for each word.

4. Known Words ImportKnownWordsFile

This process imports a custom Known Words List from a tab delimited text flat file. Additional details for formatting are provided in the code comments below. Each time a new text file is imported using this process, a background process is started which saves/creates a binary formatted version of the text file for faster future file loads.

5. Known Words Base Scores

This section describes all the Known Words sub-processes required to support the Known Words Base Score calculation.

Known Words Base Scores can be calculated by calling the GetLogKnownTermFreq sub-process within Known Words (the CKnownWordsList object). This calculation is typically accessed by other processes which are passed the Known Words object by reference as a supporting object. The Term Scorer 310 is an example of a ULC Engine object that is supported by both Known Words scoring processes (Base and Categorization Scoring).

Known Words Base Scores are always calculated at the individual Token/Keyword level. This means that if a Keyword Phrase containing multiple Keywords is passed to the GetLogKnownTermFreq process for a Base score calculation, GetLogKnownTermFreq immediately divides that phrase into individual Keyword components.

Each Keyword contained in the input text is then passed to the GetKnownFreq process which accesses the in-memory Known Word List to determine all category frequencies for each specific Keyword requested. The Known Words List is C# Dictionary of type <string, int[ ]> where string is the Key data type and int[ ] (array of integers) is the value data type. Each record in the C# Dictionary contains one key which represents the Keyword value, and one C# Array of integers that contains one integer value (the frequency) for each category contained in the Known Words List. The C# Dictionary is an in-memory hash table that provides near instant access to the in-memory location of the required frequency score Array when a Keyword "dictionary key" is provided to the dictionary. Each frequency value in the in-memory integer Arrays represents a keyword's frequency of occurrence within each Known Words List Category. When this value is compared to a category's sum total of all frequencies for all words, it is very easy to rapidly determine how "rare" or obscure a word is in a particular category.

If a requested Keyword does not exist the values from 1PctOfAllKnownWords are returned. These values represent the frequency totals for all words in each category*0.000122144863808477 (see detailed explanation in previous section).

In the current implementation, if the requested Keyword exists within the Known Words List, the GetKnownFreq process also passes all requested word frequency values to the IncrementCategoryPenetrationTotals process. This process is used to keep track of Category Penetration Score Totals until the totals are reset via the ResetCategoryTotals command by the Known Words managing process.

Since the overhead for this process is so minimal, there currently is not a way to exclude categorization (Category Penetration Score totals tracking) from happening during the Base Score Calculation. However, in an alternate implementation of this process, Categorization could be removed totally from the Base Score Calculation by simply removing the IncrementCategoryPenetrationTotals process call from the GetKnownFreq process.

Once a Keyword's frequencies have been obtained from the Known Words List via GetKnownFreq:

If additional Keywords exist in the input text (a Keyword Phrase), then the GetKnownFreq process is called once for each word in the phrase.

Category level frequency results from the previous Keywords are multiplied by any new results returned from additional GetKnownFreq requests. This process is repeated until all keywords in the phrase have been processed.

Results from this process are stored in the Array dRelFreq

Once the blended frequency has been determined above:

The Known Words Base Score Calculation is determined using the following calculation:

$$dRelFreq[i] = Math \cdot Log((dRelFreq[i]/Math \cdot Pow((double)m\_iSumAllKnownWords[i], sW \cdot Length))*(double)m\_iSumAllKnownWords[i]/+2.0);$$

Where i=0 to the total number of categories contained in the Known Words list.

This calculation is equivalent to:

AdjFreq=Known Words Frequency*=(Any other Known Words Frequencies for each additional word in the input text/phrase)

Known Words Base Score=Log((AdjFreq/(Category Freq Total˜Category Count))*(Category Freq Total+2)

Known Words Category Penetration Scores

This section describes all the Known Words sub-processes required to support the Category Penetration Scores calculation. Known Words Category Penetration Scores are calculated by calling the Known Words GetKnownFreq process.

When GetKnownFreq is called, the requested Keyword is located in the Known Words List. If the Keyword exists, the IncrementCategoryPenetrationTotals process is called and category penetration totals are updated.

Each category is incremented by its respective value returned from the Known Words List via the GetKnownFreq process. Category Penetration Scores are tracked/incremented until the ResetCategoryTotals process is called.

When Category Penetration Scores are required, the SetHighCategory process is executed and a final Category Penetration Score is generated for each category in the Known Words List.

Each category penetration "running total" from the IncrementCategoryPenetrationTotals process is divided by that Category's sum total of all word frequencies to produce a category penetration % value. This value is then passed through the KnownWordsScores object to determine/set high and low score data. This process produces a set of Sorted Category Penetration Scores that indicate which Known Words Category is most similar to the input text provided since the last time the ResetCategoryTotals process was called.

Known Words Similarity Index

The Known Words Similarity Index is not required for either Known Words Base Scoring or Categorization. Each time the Categorization High Category is set using the SetHighCategory process, the SetCategorySimilarityIndex executes to calculate the absolute value of the sum of all category distances from the total score. (similar to the Euclidean Distance calculation). This process is not required and is only provided as supplemental information about the similarity of a given set of category scores.

KnownWordsSerialize

The KnownWordsSerialize process manages accessing and saving the Known Words List from/to disk. This process uses the third party open-source project ProtocolBuffers.Net to manage all serialization processes. When KnownWordsSerialize saves a Known Words List, it serializes the Known Words List C# Dictionary object (containing all word keys and category frequencies for each word) and a C# string array containing the Known Words List Category Names to the same binary file. ProtocolBuffers.Net manages the serialization process and compresses the object data. Using ProtocolBuffers.Net and binary serialization reduces the Known Words List size by 50% and allows it to load approximately twice as fast as the same file in a text format.

Binary serialization removes the dependency for Known Words Lists to be saved in a database format. Retrieving/looking up Known Words List keys from a database is much slower than loading the file into memory one time during the ULC Engine initialization stage and getting in-memory lookups for all required keys. In addition, the C# Dictionary object is an in-memory hash table. The serialization process writes this object in its native C# format to disk. When the object is loaded into memory, the C# Dictionary provides an O(1) constant time complexity (non-linear) for key lookups. No matter how many records/keys are added to the Dictionary, lookup response times remain constant and very, very fast.

Known Words Conclusion

The Known Words (CKnownWordsList object) contains two distinctly separate processes:

Known Words Base Score Calculation

Known Words Category Penetration Score Calculation

These processes are included in the same class to further enhance the speed of the ULC Engine. Both processes require category level word frequencies from the Known Words List, and duplicate list lookups are avoided by sharing the same class. Alternate processes described in this section could greatly enhance the performance of the Categorization process by separating it from other processes within the ULC Engine.

In alternate embodiments, a Categorization engine may process parameterless queries or models against large volumes of both structured and unstructured data. For example, large volumes of data contained within database tables. This would allow users to request that the new categorization process return/locate for them data that looks "closest" to a provided target dataset instead trying to programmatically describe a dataset based on their own conditions which may or may not represent all aspects of the actual data they are looking for.

In this type of implementation, instead of writing "where" clauses/conditions/criteria to identify target data populations of data, example target populations of data could be "learned" as new Known Words List Categories from current, past, test, or example datasets using the KnownWordsCUD Learning process described later in this document.

The Known Words Category Penetration Score Calculation may be modified to support various data types and ranges within a Known Words List. In this scenario, one single Known Words List could be used or multiple Known Words Lists could be developed for each Known Words List Key data type supported by the process. Numeric Known Words List key data types could be used to enhance categorization matching and the returned frequencies used for categorization. For instance, if the key 777 was requested from the Known Words List and did not exist, the process could return the frequency for the Key closest to this value such as the key 778, or average for the 2 closest keys (776 and 778). This same approach could be used for other data types as well allowing data miners more Categorization score flexibility when searching for data.

In order for Known Words Category Penetration Score Calculations to be performed on databases a new Token Mapping process would be required. In the current ULC Engine, both the Sentence Parser and the Noun Parser act as Token maps (for the English language in a current implementation). In a database scenario, token mapping would be easier since database table row may become sentences and database columns could become Tokens. In addition, since data types are mapped in a database, new data type specific functionality could be added to enhance how frequency values are returned as in the numeric example above. Token Maps may be developed for any type of data or language making exposing ULC Engine processes, specifically categorization to any language or other forms of both structured and unstructured data.

ULC KnownWordsCUD Processes

The KnownWordsCUD process manages Known Words Category updates, deletions, and additions for any Known Words List provided at creation time. The KnownWordsCUD process also includes the implementation of Learning Mode where input text is processed, and the resulting words/tokens are added into a specific Known Words List Category.

The ULCWrapper class contains several processes which utilize the KnownWordsCUD class. Each process is contained in the ULCWrapper. Category Management region of the class. Primary Category Management processes provided by KnownWordsCUD include the following for any Known Words List provided:

Getting Summary Level Details for all Categories

This process returns summary level details for each category in the current Known Words List as described in the comments below:

Deleting a Category

This deletes one or multiple categories from the Known Words List.

Renaming a Category

Renames one a category from the Known Words List.

Create a Category

Creates one a category in the Known Words List.

Learn Text

Goes through each word in the provided input text and increments 1 or more category frequencies for each word identified.

Each time the Known Words List is modified, the ULCWrapper class utilizes the KnownWordsSerialize process to save changes to disk via the ULCWrapper. SaveCategoryFile process. The Known Words List can be saved in a background process in this implementation, if requested by the user.

Changes to the Known Words List occur in memory and take effect immediately for the current process/list. The SaveCategoryFile process only writes these changes to disk so they will reflected any time that list is loaded into memory in the future.

Known WordsCUD Process Definitions

1. KnownWordsCUD Process Creation (Constructor)

When a KnownWordsCUD process is created, it must be provided a Known Words List (CKnownWordsList object) by reference. This will be the Known Words List that the KnownWordsCUD process makes changes and updates to during all processes.

2. KnownWordsCUD GetAllCategoriesDetails

The GetAllCategoriesDetails process creates a read-only IEnumerable collection of string arrays that contains the following details about each Known Words Category contained in the current Known Words List:

Category Name—The name of the category for which details are being provided.

Category Unique Word Count—Count of all unique words for a category that have a word frequency >0.

Category Total Word Frequency—Sum of all word frequencies for a category.

Category Average Frequency Per Word—Category Total Word Frequency divided by the Category Total Word Frequency.

During the GetAllCategoriesDetails process, every word key in the in-memory Known Words List is iterated and one collection of totals is maintained for each category in the list. These totals are incremented by 1 (representing 1 unique word) any time an individual frequency value for a given wordkey and category is greater than 0.

From this point the Known Words List Special Key "~SumAllKnownWords" is accessed. This Special Key record contains a collection of totals that represent the total word frequency for each category. All remaining category details can then be calculated for each category using the unique word count and the values in the "~SumAllKnownWords" Known Words List Special Key record.

3. KnownWordsCUD DeleteCategory

The DeleteCategory process deletes/removes an entire category or multiple categories and all related word frequencies from the current Known Words List.

The Category deletion process works by:

Identifying the index numbers for the target categories to be deleted

Building a new list of Category Names excluding the deletion category candidates Creating a HashSet of Category Index Numbers for the deletion category candidates (a HashSet provides the fastest lookups times for a single list of items)

Reducing the intern Category Count variable kwCategoryCount by the number of categories contained in the deletion category HashSet.

DeleteCategory then loops through every wordKey in the current Known Words List dictionary creating a new Known Words List dictionary and new wordKey category frequency arrays with the correct number of category frequencies for each word in the current Known Words List (excluding all category indexes contained in the deletion category indexes HashSet).

All Known Words List Special Keys such as "~SumAllKnownWords" are skipped during the looping process.

Category Frequency Totals for each word key are re-calculated to reflect the removed category frequencies.

The Grand Total for all Categories is also update.

Once all updates are completed, the new Known Words List dictionary replaces the current/old in-memory Known Words List.

4. KnownWordsCUD RenameCategory

The ULCWrapper class does not require a specific process within KnownWordsCUD to rename a category. Categories are renamed by simply changing the name of the category directly in the Known Words. kwCategoryNames collection. The KnownWordsCUD.GetCategoryIndex process is used to obtain the current index number of the category name within the kwCategoryNames collection.

The following ULCWrapper.RenameCategory process is located in the ULCWrapper.CategoryManagement region.

The KnownWordsCUD.GetCategoryIndex process locates the correct category index number when provided a valid category name. This is used in a number of KnownWordsCUD processes to locate the category index number.

The category index number represents the category names actual location with the Known Words List kwCategoryNames collection.

5. KnownWordsCUD CreateCategory

CreateCategory creates a new Known Words List Category by:

Moving all categories and word frequencies from the current Known

Words List into a new Known Words List.

Adding the new category to the list of category names

Adding a new frequency holder for the new category to each keyword's word frequencies. (set with a default value of 0)

The new Known Words List then replaces the old Known Words List.

Adding a new frequency holder for the new category totals Special Key "~SumAllKnownWords"

Adding a new frequency holder for the new category 1% of total value collection. (Known Words. m_1PctOfAllKnownWords)

Reset any categorization totals by calling the Known Words. ResetCategoryTotals process.

Calling the UpdateKnownWordsFileDate process.

Setting the m_KnownWordsFileChanged indicator to true.

6. KnownWordsCUD IncrementKnownWordsByDocument

The IncrementKnownWordsByDocument process is very critical to all scores produced by Known Words. Specifically the process of Categorization would be limited to only pre-existing categories without the IncrementKnownWordsByDocument process. IncrementKnownWordsByDocument uses the KnownWordsWordParser process to rapidly break input text into individual words. Each word is then located in the current Known Words List and each category for that specific word key is incremented by the values specified within the CategoryFrequencyIncrements provided by the caller. The process has the ability to either learn new words OR only increment frequencies for words that already exist in the Known Words dictionary. This is a very important feature since the Known Words List resides in memory. The caller can closely monitor input text for spelling and other word problems, or they can create a Known Words List that contains an "acceptable" or "comprehensive enough" amount of valid words for Known Words scoring processes and then ignore any words that do not exist on that list.

The ULCWrapper class exposes IncrementKnownWordsByDocument within the LearnText process:

IncrementKnownWordsByDocument utilizes the KnownWordsWordParser process to quickly identify each individual word from its input text in a highly parallel/multi-threaded fashion.

KnownWordsWordParser Process

The parallel structure of the KnownWordsWordParser process is very similar to both the Sentence Parser and the Noun Parser and will not discussed in this document as the description would be almost identical to the Sentence Parser and the Noun Parser sections. However, obtaining words from the KnownWordsWordParser is much more efficient, since sentence boundary detection and Noun Parser Keyword detection via lookups on the NotNouns List is not required. The KnownWordsWordParser identifies all words separated by characters which do not appear in the ValidChar HashSet.

IncrementKnownWordsByDocument Processes Dependencies

Once the KnownWordsWordParser identifies word candidates for the IncrementKnownWordsByDocument process, the following KnownWordsCUD processes are executed in following order:

IncrementDocument_NewWords (if AddNewWords=true)

IncrementDocument_NoNewWords (if AddNewWords=false)

UpdateCategoryTotal

7. KnownWordsCUD IncrementDocument and UpdateCategoryTotal

The IncrementDocument_NewWords and IncrementDocument_NoNewWords are near identical processes that have been separated to enhance the performance of the learning process. IncrementDocument_NoNewWords avoids an "if" statement on every lookup by being separate from the IncrementDocument_NewWords process.

Both processes take a C# Blocking Collection of words as input. In the current ULC Engine implementation, the Known Words List Dictionary is not a thread safe dictionary so a multi-threaded locking strategy is required. However, in an alternate implementation, a C# Concurrent Dictionary could be used with no locking strategy required. However, extensive testing should be done to determine, if slower lookup speeds inherent in the Concurrent Dictionary are an acceptable price to pay for elimination of the required locking strategy in the current implementation.

Once of C# Blocking Collection of words has been provided to either process, each word is looked up in the current Known Words List Dictionary. If the word exists, each category frequency for that word is incremented by the values contained in the category increments provided by the calling process.

For example, if there are 3 categories contained in the current Known Words List and the category increments provided by the calling process are [0, 0, 1, 2], then:

for each word that is provided if that word exists in the current Known Words List Dictionary Frequencies for Category 0 are always irrelevant since Category 0 always represents the Totals column.

Category 1 would be incremented by 0
Category 2 would be incremented by 1
Category 3 would be incremented by 2

This gives the calling process the ability to weight words from various input text with much higher importance/frequencies when needed. The IncrementDocument_NewWords process will also add new/unrecognized words to the current Known Words List Dictionary during processing.

UpdateCategoryTotal executes at the end of each learning process to recalculate the word frequency totals for all categories in the Known Words List Dictionary. UpdateCategoryTotal loops through every word in the Known Words Dictionary keeping category word frequency totals for each category in the Known Words List. When this process is complete, the Special Key record "~SumAllKnownWords" is updated with all of the category totals values.

KnownWordsCUD Conclusion

KnownWordsCUD may contain other processes that provide users the ability to browse the contents of the Known Words List.

The KnownWordsCUD process may also provide users the ability to update a provided Known Words List's categories as needed. In addition, KnownWordsCUD manages Known Words Learning which primarily has the ability to take either Tokens or Phrases as "Keys" and manage a collection of category frequencies for each key that indicate how often a word occurs in a given category.

It is important to note that in the case of Known Words Base Scores, the score/importance increases as the word's frequency decreases within a category. However, in the case of Known Words Category Penetration Scores (i.e. Categorization), the score/importance increases as the word's frequency increases for any given key.

For instance, if the wordkey "Dog" was used 100 times in the category "Pets" and only 10 times in the category "History", "Pets" would be chosen as the winning category for the word "Dog". However, the word Dog would receive a higher Known Words Base Score in the category "History". The Known Words Base Score reflects a higher score for the more obscure words within a category, the usage of the word "Dog" within the context of the category History is much less common than usage of the word "Dog" with in the "Pets" category. This difference is positively reflected in the Known Words Base Score for the history category. The ULC Engine only uses Known Words Base Score as part of a relevance score calculation that is explained in greater details within the Term Scorer section.

Known Words Categories/Lists may be created to perform many different types of tasks. For instance, a Known Words Category named "4" that only contained the Tokens "2" and "+" (the token 2 would contain a frequency of 2 in the "4" category of course) would be chosen against any number of categories when provided the input text "2+2".

In a broad sense, a Known Words List can be used to turn words into "numerical values with semantic meaning" that can accurately point back to another "definition word" (the category name) when all Known Words List word frequencies are taken into account across any broad number of categories. Known Words List "diagnoses" categories could be created from the medical dictations of doctors for patients that have already been successfully diagnosed (after the fact). Then, new medical dictations could be categorized against these "diagnoses" categories (before the fact) to help diagnose new patients or help new doctors diagnose new patients. Patent Lawyers could create "patent categories" for all known patents and then categorize new patents against these "patent categories" to determine what patents the new patent is most similar to in content.

Computing

Figure 8:
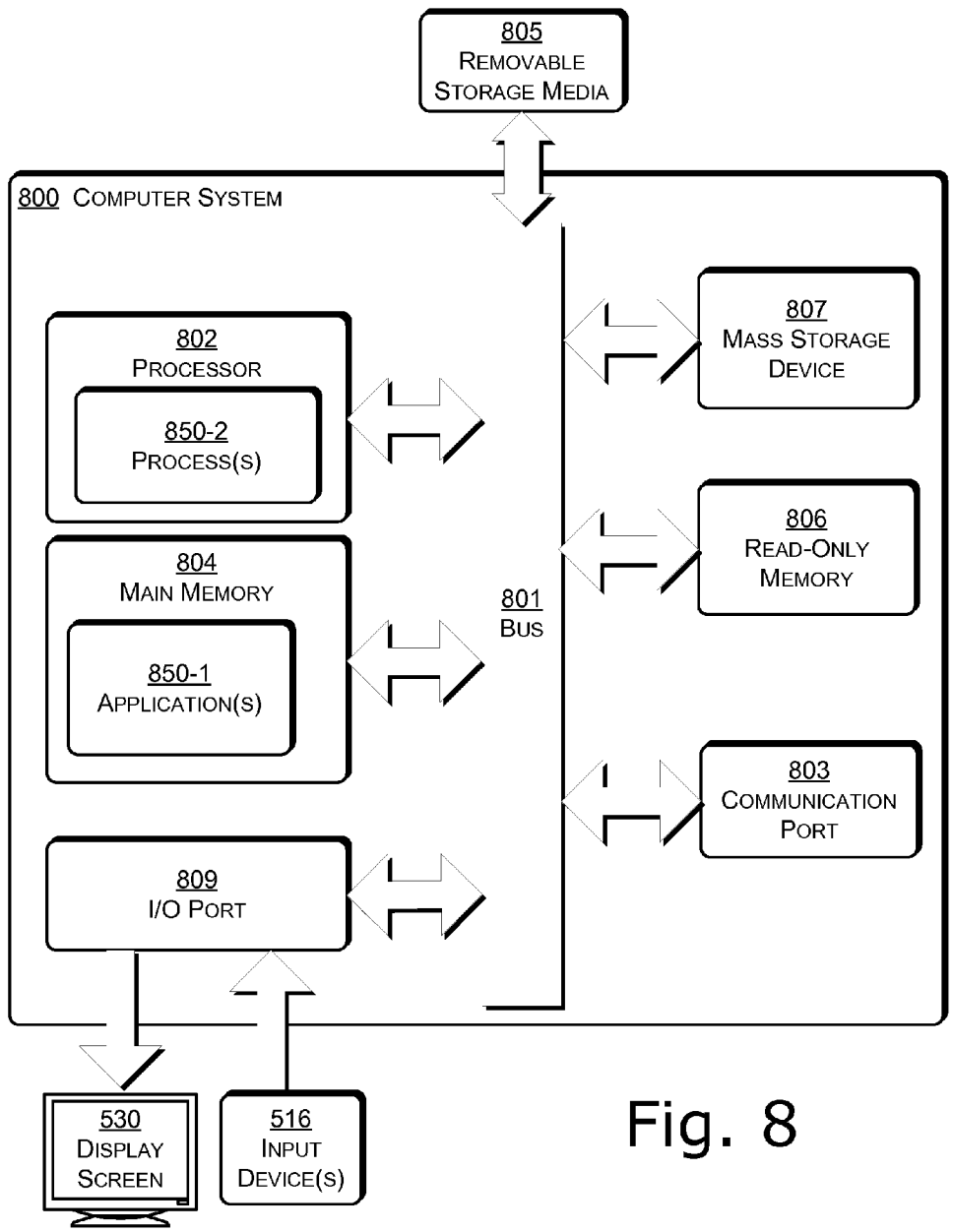
FIG. 8 is a schematic diagram of an exemplary computer system.

FIG. 8 is a schematic diagram of a computer device/system 800 upon which embodiments/aspects of the present disclosure may be implemented and carried out. According to the present example, the computer system 800 includes a bus 801 (i.e., interconnect), at least one processor 802, at least one communications port 803, a main memory 804, a removable storage media 805, a read-only memory 806, and a mass storage 807. The computer system 800 may be in communication with peripheral devices (e.g., one or more display device(s) 830, and one or more input device(s) 816) via Input/Output (I/O) port 809. The display devices 830 may be, e.g., display screens and the like, and the one or more input devices 816 may be, e.g., keyboards, touch screens, voice recognized input and the like. It should be appreciated that the input devices 816 may be integrated into the display devices 830, such as in the case of a device having a touch screen.

As shown, main memory 804 is encoded with one or more applications 850-1 that support the functionality as discussed herein. Application(s) 850-1 (and/or other resources as described herein) can be embodied as software code such as data and/or logic instructions (e.g., code stored in the memory or on another computer readable medium such as a disk) that supports processing functionality according to different embodiments described herein.

During operation of at least one embodiment, processor(s) 802 accesses main memory 804 via the use of bus 801 in order to launch, run, execute, interpret or otherwise perform the logic instructions of the application(s) 850-1. Execution of an application 850-1 produces processing functionality in process 850-2. In other words, the process 850-2 represents one or more portions of the application 850-1 performing within or upon the processor(s) 802 in the computer system 800.

Although shown as separate applications in the drawings, this separation is for descriptive purposes only, and it should be appreciated that the particular functionality associated with any particular application may be shared with or integrated into other applications. Those of skill in the art will realize and understand, upon reading this description, that the applications may be separate and distinct or that some or all of the applications may be incorporated into programs supporting their combined functionality.

As noted above, although shown in FIG. 10 as separate applications in the drawing, this separation is for descriptive purposes only, and it should be appreciated that the particular functionality associated with any particular application may be shared with or integrated into other applications. In addition, it should be understood that the various applications shown may interface and interact with each other as needed.

In should be appreciated that the various applications may interact with each other directly or indirectly. It should also be appreciated that the various applications may interact with other applications, including external applications, as needed.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

It should be noted that, in addition to the process(es) 550-2 that carry/carries out operations as discussed herein, other embodiments herein include the application(s) 550-1 itself/themselves (i.e., the un-executed or non-performing logic instructions and/or data). Some or all of the application(s) 550-1 may be stored on a computer readable medium (e.g., a repository) such as a disk, hard disk or in an optical medium. According to other embodiments, some or all of the application(s) 550-1 can also be stored in a memory type system such as in firmware, read only memory (ROM), or, as in this example, as executable code within the main memory 504 (e.g., within Random Access Memory or RAM). For example, some or all of the application(s) 550-1 may also be stored in removable storage media 505, read-only memory 506, and/or mass storage device 507.

With reference again to FIG. 5(*a*), processor(s) 502 can be any known processor, such as, but not limited to, an Intel® Itanium® or Itanium 2® processor(s), AMD® Opteron® or Athlon MP® processor(s), or Motorola® lines of processors, and the like. Communications port(s) 903 can be any of an RS-232 port for use with a modem based dial-up connection, a 10/100 Ethernet port, a Gigabit port using copper or fiber, or a USB port, and the like. Communications port(s) 503 may be chosen depending on a network such as a Local Area Network (LAN), a Wide Area Network (WAN), a CDN, or any network to which the computer system 500 connects.

Main memory 504 can be Random Access Memory (RAM), or any other dynamic storage device(s) commonly known in the art. Read-only memory 506 can be any static storage device(s) such as Programmable Read-Only Memory (PROM) chips for storing static information such as instructions for processor(s) 502. Mass storage 507 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 501 communicatively couples processor(s) 502 with the other memory, storage and communications blocks. Bus 501 can be a PCI/PCI-X, SCSI, a Universal Serial Bus (USB) based system bus (or other) depending on the storage devices used, and the like. Removable storage media 505 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM), etc.

Embodiments herein may be provided as a computer program product, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

Example functionality supported by computer system 500 and, more particularly, functionality associated with application(s) 550-1 is discussed above.

Those skilled in the art will understand that the computer system 500 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of skill in the art will appreciate that the process may operate without any user intervention. In another embodiment, the process includes some human intervention (e.g., a step is performed by or with the assistance of a human).

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, whether in the written description or the claims, "plurality" means two or more.

As used herein, whether in the written description or the claims, the terms "comprising", "including", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

We claim:

1. A computer-implemented method, implemented, at least in part, by hardware in combination with software, the method comprising:
   (A) obtaining text from a document;
   (B) parsing said text using at least one parallel sentence parsing process to obtain sentence data from said text;
   (C) parsing said sentence data using at least one parallel noun parsing process to obtain text data from said sentence data;
   (D) scoring said text data using at least one term scorer process and a known word list to obtain scored terms corresponding to said text data; and
   (E) determining known word scores corresponding to said text data, using said known word list, wherein said known word scores comprise base scores and category penetration scores;
   wherein steps (B), (C), (D), and (E) operate in parallel for at least some of the text from the document.

* * * * *